US007062561B1

(12) United States Patent
Reisman

(10) Patent No.: US 7,062,561 B1
(45) Date of Patent: Jun. 13, 2006

(54) METHOD AND APPARATUS FOR UTILIZING THE SOCIAL USAGE LEARNED FROM MULTI-USER FEEDBACK TO IMPROVE RESOURCE IDENTITY SIGNIFIER MAPPING

(76) Inventor: Richard Reisman, 20 E. 9th St., New York, NY (US) 10003

( * ) Notice: Subject to any disclaimer, the term of this patent is extended or adjusted under 35 U.S.C. 154(b) by 0 days.

(21) Appl. No.: 09/576,927

(22) Filed: May 23, 2000

(51) Int. Cl.
*G06F 15/16* (2006.01)
*G06F 15/173* (2006.01)

(52) U.S. Cl. ............... 709/227; 709/203; 709/226; 709/238

(58) Field of Classification Search ........... 709/203, 709/206, 223–227; 707/3–5; 705/27; 715/513
See application file for complete search history.

(56) References Cited

U.S. PATENT DOCUMENTS

| | | | | |
|---|---|---|---|---|
| 4,974,191 A | | 11/1990 | Amirghodsi et al. | 364/900 |
| 5,224,205 A | | 6/1993 | Dinkin et al. | 395/200 |
| 5,511,208 A | | 4/1996 | Boyles et al. | 395/800 |
| 5,659,731 A | * | 8/1997 | Gustafson | 707/4 |
| 5,715,395 A | | 2/1998 | Brabson et al. | 395/200.13 |
| 5,748,945 A | | 5/1998 | Ng | 395/500 |
| 5,751,956 A | | 5/1998 | Kirsch | 395/200.33 |
| 5,764,906 A | | 6/1998 | Edelstein et al. | 395/200.49 |
| 5,794,050 A | | 8/1998 | Dahlgren et al. | 395/708 |
| 5,835,897 A | | 11/1998 | Dang | 705/2 |
| 5,855,020 A | | 12/1998 | Kirsch | 707/10 |
| 5,929,852 A | | 7/1999 | Fisher et al. | 345/335 |
| 5,974,444 A | | 10/1999 | Konrad | 709/203 |
| 5,978,847 A | * | 11/1999 | Kisor et al. | 709/227 |
| 6,006,222 A | | 12/1999 | Culliss | 707/5 |
| 6,014,665 A | | 1/2000 | Culliss | 707/5 |
| 6,029,192 A | * | 2/2000 | Hill et al. | 709/206 |

(Continued)

FOREIGN PATENT DOCUMENTS

WO     WO 99/19816     4/1999

(Continued)

OTHER PUBLICATIONS

"What is 1 jump", available at http://www.1jump.com/as of Nov. 11, 1999.

(Continued)

*Primary Examiner*—Rupal Dharia
*Assistant Examiner*—Quang N. Nguyen
(74) *Attorney, Agent, or Firm*—Min, Hsieh & Hack LLP

(57) ABSTRACT

An apparatus for finding resources on a network comprises a finder server having access to: (a) a database including: (i) an index of resources available on network of interconnected computers on which a plurality of resources reside; and (ii) information regarding user feedback gathered from previous operations of the apparatus by a user and plural previous users; and (b) a learning system operable to access and learn from information contained on the database. The finder server is operable to locate, in response to entry by the user of a resource identity signifier, a single intended target resource intended by the user to uniquely correspond to the resource identity signifier, from among a plurality of resources located on the network, by: receiving a resource identity signifier from the user; accessing the database to determine, based on the information in the database, which, if any, of the indexed resources is likely to be the intended target resource; and directing a computer of the user so as to cause that computer to connect the user to the address of the resource, if any, determined as likely to be the intended target resource.

55 Claims, 6 Drawing Sheets

U.S. PATENT DOCUMENTS

| | | | |
|---|---|---|---|
| 6,041,311 A * | 3/2000 | Chislenko et al. | 705/27 |
| 6,067,539 A | 5/2000 | Cohen | 707/2 |
| 6,092,100 A * | 7/2000 | Berstis et al. | 709/203 |
| 6,112,242 A * | 8/2000 | Jois et al. | 709/225 |
| 6,138,155 A * | 10/2000 | Davis et al. | 709/224 |
| 6,151,624 A | 11/2000 | Teare et al. | 709/217 |
| 6,192,364 B1 | 2/2001 | Baclawski | 707/10 |
| 6,269,361 B1 | 7/2001 | Davis et al. | 707/3 |
| 6,271,840 B1 * | 8/2001 | Finseth et al. | 715/513 |
| 6,366,956 B1 * | 4/2002 | Krishnan | 709/223 |
| 6,460,036 B1 | 10/2002 | Herz | 707/10 |
| 6,480,837 B1 * | 11/2002 | Dutta | 707/3 |
| 6,546,388 B1 * | 4/2003 | Edlund et al. | 707/5 |
| 6,615,237 B1 * | 9/2003 | Kyne et al. | 709/203 |
| 6,873,982 B1 * | 3/2005 | Bates et al. | 707/5 |

FOREIGN PATENT DOCUMENTS

| | | |
|---|---|---|
| WO | WO 99/39275 | 8/1999 |
| WO | WO 99/39280 | 8/1999 |

OTHER PUBLICATIONS

"Alexa FAQ's", available at http://www.alexa.com/whatisalexa/faq.html as of Feb. 14, 1998.

"1 jump for Windows features and benefits" available at http://www.1jump.com/featurebenefit.html as of Nov. 11, 1999.

"1 jump company and contact information", available at http://www.1jump.com/corp.html as of Nov. 11, 1999.

"Alexa User Paths", available at http://www.alexa.com/whatisalexa/user_paths.html. as of Feb. 14, 1998.

John F. Ince, "Searching for Profits: The pioneers had to expand to make money. Will the next wave fare any better?" Upside, May 2000 available at http://www.upsidetoday.com.

Jim Rapoza, "Alex's Theory of Relativity Filtering analytical algorithms link to Web site s—relevant or not", PC Week Labs available at http://www.Zdnet.com/pcweek/reviews/0818/18alex.html as of Feb. 14, 1998.

"1 jump Help menu", available at http://www.alexa.com.

"What is 1Jump" about, available at http://www.1jump.com/about.html as of Nov. 11, 1999.

J. Klensin et al., "Domain Names and Company Name Retrieval," RFC2345, Network Working Group Request for Comments: 2345, May 1998.

B. Chidlovskii et al., "Collaborative Re-ranking of Search Results," AAAI-2000 Workshop on AI for Web Search, Online, Jul. 30, 2000, XP002250910.

R. Alton-Scheidl et al., "Select: Social and Collaborative Filtering of Web Documents and News," Proceedings of the 5th ERCIM Workshop on User Interfaces for All: User-Tailored Information Environments, Online, Nov. 28, 1999-Dec. 1, 1999, XP002250911.

A. Paepcke et al., "Beyond Documents Similarity: Understanding Value-Based Search and Browsing Technologies," Sigmond Record, ACM, USA, Online, vol. 29, No. 1, Mar. 2000, pp. 80-92, XP002250912.

"BAA 00-07 Proposer Information Pamphlet: Agent Based Computing," available at http://www.darpa.mil/iso/ABC/BAA0007PIP.htm as of Dec. 11, 2000.

"How does inference find work?," available at http://www.infind.com/about.html as of Nov. 11, 1999.

K. Hall, "Ask Jeeves Takes Direct Hit," available http://www.gigaweb.com/Content/GIB/RIB-022000-00177.html, as of Feb. 19, 2000.

"Latest engines go vertical in search of relevant information," Harved Computing Group Report, available at http://www.bettergetter.com/betterg/demo/whitepaper.jsp as of Dec. 20, 1999.

"About the W3-CorporaProject," available at http://www.essex.ac.UK/W3c/corpus_ling/about.html as of Aug. 24, 2000.

"Language Translation," available at http://www-dse.doc.ic.ac.UK/~nd/surprise_97/journal/vol4/hks/trans.html as of Aug. 23, 2000.

"Conclusion," available at http://www-dse.doc.ic.ac.UK/~nd/suprise_97/journal/vol4/hks/conclu.html as of Aug. 23, 2000.

"Language Software," available at http://www-dse.doc.ic.ac.UK/~nd/surprise_97/journal/vol2/hks/lan_trans.html. as of Aug. 23, 2000.

"Symmetry Health Data Systems Achieves Patent ETG and 'Dynamic Time Window' new industry standards," available at http://www.Symmetry-health.com/PR_Patent.html as of Jun. 21, 2000.

"Resource for the Semantic Web," available at http://www.semanticweb.org/resources.html as of May 27, 2000.

Web Design Issues: What a Semantic Can Represent, available at http://www.w3.org/DesignIssues/RDFnot.html as of Dec. 8, 2000.

B. Metcalfe, "Web Father Berners-Lee Shares Next-Generation Vision of the Semantic Web," InfoWorld, vol. 21, Issue 21, May 24, 1999.

T. Berners-Lee, "The Meaning of a Document—Axioms of Web Architecture," available at http:///www.w3.org/DesignIssues/Meaning.html, 1999, last modified Jan. 24, 2000.

A. Chislenko, "Semantic Web Vision Paper," version 0.28, Jun. 29, 1997, available at http://www.lucifer.com/~sasha/Articles/SemanticWeb.html.

T. Berners-Lee, "Semantic Web Road Map," Sep. 1998, available at http://www.W3.org/DesignIssues/Semantic.html.

T. Berners-Lee, "Semantic Web as a Language of Logic," 1998, available at http://www.W3.org/DesignIssues/Logic.html.

"Semantic Search—The SHOE Search Engine," available at http://www.cs.umd.edu/projects/plus/SHOE/search/ as of May 29, 2000.

"Telcordia™ Latest Semantic Indexing Software (LSI): Beyond Keyword Retrieval," available at http://lsi.research.telcordia.com/lsi/papers/execsum.html as of Dec. 11, 2000.

J. Heflin et al., "Searching the Web with SHOE," Dept. of Computer Science, University of Maryland, May 29, 2000.

"The SHOE FAQ," available at http://www.cs.umd.edu/projects/plus/SHOE/faq.html as of May 29, 2000.

D. Soergel, "Review of WordNet," D-Lib Magazine, Oct. 1998, available at http://www.dlib.org/dlib/October98/10bookreview.html.

H. Boley et al., "Tutorial on Knowledge Markup Techniques," Aug. 22, 2000, available at http://www.semanticweb.org/knowmarktutorial/.

P.J. Hane, "Beyond Keyword Searching—Oingo and Simpli.com Introduce Meaning-Based Searching," Dec. 20, 1999, available at http://www.infotoday.com/newsbreaks/nb1220-2.htm.

S. Cleary, "Simpli.com Uses Linguistics to Help Web Engines Do Better Searches," Wall Street Journal Interactive Edition, Feb. 7, 2000.

"SimpliFind Technology White Paper," available at http://www.simpli.com/search_white_paper.html as of Dec. 11, 2000.

R. Hellman, "A Semantic Approach Adds Meaning to the Web," Computer, Dec. 1999.

J.E. Kendall et al., "Information Delivery Systems: An Exploration of Web Pull and Push Technologies," Communications of the Association for Information Systems, vol. 1, Art. 14, Apr. 1999.

K.E. Kendall, "Artificial Intelligence and Götterdämerung: The Evolutionary Paradigm of the Future," The Data Base for Advances In Information Systems, vol. 27, No. 4, Fall 1996, pp 99-115.

S. Alter, "A General, Yet Useful Theory of Information Systems," Communications of the Association for Information Systems, vol. 1, Art. 13, Mar. 1999.

T. Bray et al., "Extensible Markup Language (XML) 1.0 W3C Recommendation Feb. 10, 1998," REC-xml-19980210, http://www.w3.org/TR/1998/REC-xml-19980210, Feb., 10, 1998.

Anonymous, "XML: Enabling Next-Generation Web Applications," Microsoft Corporation, http://msdn.microsoft.com/archive/en-us/dnarxml/html/xmlwp2.asp?frame=true, Apr. 3, 1998.

Anonymous, "UDDI Technical White Paper," http://www.uddi.org/pubs/lru_UDDI_Technical_White_Paper.pdf, Sep. 6, 2000.

Anonymous, "Electronic Business XML (ebXML) Requirements Specification—ebXML Candidate Draft Apr. 28, 2000," http://www.ebxml.org/specdrafts/RSV09.htm, Apr. 28, 2000.

Anonymous, "BizTalk™ Framework 1.0 Independent Document Specification," BizTalk Enabling Software to Speak the Language of Business, Microsoft Corporation, Nov. 30, 1999.

Philip Costa, "Navigating the Sea of XML Standards," Giga Information Group, Dec. 14, 1999.

GlobalBrain.net, Home Page, Background and Technology from GlobalBrain.net Web site www.GlobalBrain.net, Jun. 1999.

"Real Name Temporarily Suspends Registration of Generics", from The Search Engine Report, Jan. 4, 2000, from at http://searchenginewatch.internet.com/sereport/00/01-realnames.html.

Tim Bray, "RDF and Metadata", from http://www.xml.com/xml/pub/98/06/rdf.html, 1998.

Ora Lassila, "Web Metadata: A Matter of Semantics", IEEE Internet Computing, Jul.-Aug. 1998.

Elizabeth Gardner, "Hollywood Marketers Debate Idea of URl for Every Movie", WebWeek, Jan. 19, 1998.

"Netword Receives Patent for Internet Keyword System", Netword.com Press Release, Jun. 16, 1999.

"Direct Hit Receives Funding From Draper Fisher Jarvetson", DirectHit.com Press Release, May 15, 1998.

"Direct Hit Signs Deal With Wired Digital's Hot Bot for Popularity Engine", DirectHit.com Press Release, Aug. 19, 1998.

DirectHit.com, Company & Background Articles and Frequently Asked Questions, from http://system.direchit.com/, Oct. 1998.

"Technology Overview" from DirectHit Web Site, www.directhit.com, printed Jun. 1999.

"Centraal Corporation Redefines Internet Navigation", Press release from realnames.com, Mar. 12, 1998, http://company.realnames.com/iwrelease.asp.

"Centraal Corporation FAQ", from http://company.realnames.com/FAQ.asp, Mar. 1998.

Michael Tchong, "Centraal Debuts", Mar. 11, 1998 ICONOCAST, from http://company.realnames.com/iconocast.asp.

"Access, Searching and Indexing of Directories (asid)", Jan. 1998, from http://www.ietf.cnri.reston.va.us/html.charters/asid-charter.html.

"GoTo.com, The First Ever Market-Driven Search Directory", GoTo.com Press Release, Feb. 21, 1998, from http://www.goto.com/release.html.

"URL Expansion Proposal", UseNet Thread, Jan. 1996.

Elizabeth Gardner, "Dislike Your URL? Now You Can Register a 'Netword'", WebWeek, Aug. 18, 1997.

"Netword LLC Receives Notice of Allowance", Netword.com press release, Dec. 9, 1997.

"Internet Keywords Give Consumers Direct Access to Online Resources", Netword.com Press Release, May 12, 1997.

"Why Use Networds?", Netword.com Web Site, Company Profile, FAQs, Feb. 1998 from http://www.netword.com.

R. Fielding, "How Roy Would Implement URNs and URCs Today", Internet Draft of the Internet Engineering Task Force (IETF), Jul. 7, 1995.

J. Klensin et al., "Domain Names and Company Name Retrievel", Internet Draft of the Internet Engineering Task Force (IETF), Jul. 29, 1997.

K. Sollins, "Architectural Principles of Uniform Resource Name Resolution", Informational Memo, Internet Society, Jan. 1998.

Tim Berners-Lee, "Web Architecture from 50,000 feet.", from http://www.w3.org/DesignIssues/Architecture.html., Sep. 1998.

S. Kille, "Using the OSI Directory to Achieve User Friendly Naming", Request For Comments: 1781, Internet Society, Mar. 1995.

"Global Brain To Offer Profile Searching", The Search Engine Report, Nov. 4, 1998.

S. Chakrabarti, "Mining The Web's Link Structure", Computer (IEEE), Aug. 1999.

Julie Pitta, "I&#$%.com", Forbes, Aug. 23, 1999.

J. Zittrain, "Keyword: Obsolete", Wired, Sep. 1998.

Scot Finnie, "You Can Get Satisfaction: Try IE5", Windows Magazine-Online, Jun. 1, 1999, Issue: 1006.

"Internet Explorer 3.0 for Windows 3.1 and NT 3.51: Tips and Tricks", on Microsoft Website, 1997.

"How To Search the Internet from the Address Bar In Internet Explorer", Microsoft Article ID: Q221754, www.microsoft.com, Jul. 17, 1999.

"Auto Search", from Microsoft Website, Mar. 18, 1999.

"Microsoft and Yahoo! Make Web Searches Easier For Microsoft Internet Explorer 3.0 Users Auto search to Feature Yahoo! Search Capabilities", Microsoft Media Alert, Aug. 13, 1996.

Ask Jeeves sample query, from www.askjeeves.com, Dec. 1999.

Ralph Swich et al., "Resource Description Framework (RDF)" and "Frequently Asked Questions about RDF", W3C Technology and Society Domain, printed Sep. 30, 1998 from http://www.w3.org/RDF and http://www.w3.org/RDF/FAQ.

"Why Use Google! Beta" and "Google! Beta Help" from http://www.google.com, 1999.

"What is Ask Jeeves", from http://www.askjeeves.com/docs/about/whatisaksjeeves.html, 1999.

"NBC's Snap.Com and GlobalBrain.Net Unveil Sophisticated New Technology And Services to Harness the Brain Power of Internet Users", http://www.globalbrain.net/html/release.html, Jun. 14, 1999.

GlobalBrain.net, Corporate-Technology, at http://www.globalbrain.net/html/technology.html, 1998-99.

M. MacLachlan, "Keywords Threaten Domain Name System", TechWeb, Nov. 9, 1998.

M. MacLachlan, "Netscape to Release Communicator 4.5 Beta", TechWeb, Jun. 17, 1998.

"Centraal Corporation: Company Background", from http://company.realnames.com/Backgrounder.asp, Mar. 1998.

Amy Dunlop, "Plotting and Internet Address Revolution", Internet World, Mar. 12, 1998.

Alex Lash, "A Simpler Net Address System", CNET NEWS.COM, Mar. 12, 1998.

"Startup Offers Net Addresses Sans Dots, Dashes", Reuters, Mar. 13, 1998, from http://www.zdnet.com/zdnn/content/reut/0312/293902.html.

Shumeet Baluja, Vibhu Mittal, Rahul Sukthankar, "High Performance Named-Entity Extraction", http://www.ph.tn.tudelft.nl/PRInfo/reports/msg00431.html, Jun. 29, 1999, (abstract).

Chris Sherman, "What's New With Web Search", onlineinc.com/onlinemag, pp. 27-31.

Jeff Pemberton, "Google Raises the Bar on Search Technology", Organizing the World's Information, onlineinc.com/onlinemag, pp. 43-46.

Greg. R. Notess, "The Never-Ending Quest Search Engine Relevance", May/Jun. 2000, onlineinc.com/onlinemag, pp. 35-38.

Susan Feldman, "Find What I Mean, Not What I Say", May/Jun. 2000, www.onlineinc.com/onlinemag, pp. 49-56.

"Up and Coming Search Technologies", May/Jun. 2000, onlineinc.com/onlinemag, pp. 75-77.

"A.COMversation about Internet Search Engines", May 27, 2000, http://www.digitalmass.com/news/packages/click/roundtable1.html.

* cited by examiner

FIG. 3

| Single element Q's | Possible Targets | Raw score | Experience level | Probability factor |
|---|---|---|---|---|
| Q (a) | 1<br>2<br>3 | ｜ ｜ ｜ ・・・ | ｜ ｜ ｜ ・・・ | ｜ ｜ ｜ ・・・ |
| Q (b) | 1 ・・・ | ｜ ｜ ｜ ・・・ | ｜ ｜ ｜ ・・・ | ｜ ｜ ｜ ・・・ |
| Compound/<br>(multi-element) Q's | | | | |
| Q (c) | 1<br>2 ・・・ | ｜ ｜ ｜ ・・・ | ｜ ｜ ｜ ・・・ | ｜ ｜ ｜ ・・・ |

METHOD AND APPARATUS FOR UTILIZING THE SOCIAL USAGE LEARNED FROM MULTI-USER FEEDBACK TO IMPROVE RESOURCE IDENTITY SIGNIFIER MAPPING

BACKGROUND OF THE INVENTION

1. Field of the Invention

The present invention is directed to a computer-implemented product for locating and connecting to a particular desired object or target resource from among plural resources resident at distributed locations on a network.

2. Description of the Related Art

The worldwide network of computers known as the Internet evolved from military and educational networks developed in the late 1960's. Public interest in the Internet has increased of late due to the development of the World Wide Web (hereinafter, the Web), a subset of the Internet that includes all connected servers offering access to hypertext transfer protocol (HTTP) space. To navigate the Web, browsers have been developed that give a user the ability to download files from Web pages, data files on server electronic systems, written in HyperText Mark-Up Language (HTML).

Web pages may be located on the Web by means of their electronic addresses, known as Uniform Resource Locators (URLs).

A URL uniquely identifies the location of a resource (web page) within the Web. Each URL consists of a string of characters defining the type of protocol needed to access the resource (e.g., HTTP), a network domain identifier, identification of the particular computer on which the resource is located, and directory path information within the computer's file structure. The domain name is assigned by Network Solutions Registration Services after completion of a registration process.

While the amount of information available on the Web is enormous, and therefore potentially of great value, the sheer size of the Web makes the search for information, and particular web sites or pages, a daunting task. Search engines have been developed to assist persons using the Web in searching for web pages that may contain useful information.

Search engines fall into two major categories. In search engines falling into the first category, a service provider compiles a directory of Web sites that the provider's editors believe would be of interest to users of the service. The Yahoo site is the best known example of such a provider. Products in this category are not, strictly speaking, search engines, but directories, and will be referred to hereinafter as "editor-controlled directories". In an editor-controlled directory, the developer of the directory (the "editor") determines, based upon what it believes users want, what search terms map to what web pages.

The other major category, exemplified by Altavista, Lycos, and Hotbot, uses search programs, called "web crawlers", "web spiders", or "robots", to actively search the Web for pages to be indexed, which are then retrieved and scanned to build indexes. Most commonly, this is done by processing the full text of the page and extracting words, phrases, and related descriptors (word adjacencies, frequencies, etc.). This is often supplemented by examining descriptive information about the Web document contained in a tag or tags in the header of a page. Such tags are known as "metatags" and the descriptive information contained therein as "metadata". These products will be referred to hereinafter as "author-controlled search engines," since the authors of the Web documents themselves control, to some extent, whether or not a search will find their document, based upon the metadata that the author includes in the document.

Each type of product has its disadvantages. Author-controlled search engines tend to produce search results of enormous size. However, they have not been reliable in reducing the large body of information to a manageable set of relevant results. Further, web site authors often attempt to skew their site's position in the search results of author-controlled search engines by loading their web site metatags with multiple occurrences of certain words commonly used in searches.

Editor-controlled directories are more selective in this regard. However, because conventional editor-controlled directories do not actively search the web for matches to particular search terms, they may miss highly relevant web sites that were not deemed by the editors to be worthy of inclusion in the directory. Also, it is possible for the editor to "play favorites" among the multitude of Web documents by mapping certain Web documents to more search terms than others.

Recently, search engines such as DirectHit (www.directhit.com) have introduced feedback and learning techniques to increase the relevancy of search results. DirectHit purports to use feedback to iteratively modify search result rankings based on which search result links are actually accessed by users. Another factor purportedly used in the DirectHit service in weighting the results is the amount of time the user spends at the linked site. The theory behind such techniques is that, in general, the more people that link on a search result, and the longer the amount of time they spend there, the greater the likelihood that users have found this particular site relevant to the entered search terms. Accordingly, such popular sites are weighted and appear higher in subsequent result lists for the same search terms. The Lycos search engine (www.lycos.com) also uses feedback, but only at the time of crawling, not in ranking of results. In the Lycos search engine, as described in U.S. Pat. No. 5,748,954, priority of crawling is set based upon how many times a listed web site is linked to from other web sites. This idea of using information on links to a page was later exploited by the Clever system developed in research by IBM, and the Google system (www.google.com), which do use such information to rank possible hits for a search query.

Even leaving aside the drawbacks discussed above, search engines of both categories are most useful when a user desires a list of relevant web sites for particular search terms. Often, users wish to locate a particular web site but do not know the exact URL of the desired web site. Conventional search engines are not the most efficient tools for doing this.

Moreover, naming and locating particular sites on the Web is currently subject to serious problems. For example, appropriate names, including existing company names or trademarks, may not be available, because someone registered them first. Names may be awkward and not obvious, because of length, form/coding difficulties or variant forms, and names may not justify a separate domain name registration for reasons of cost and convenience, such as movie titles or individual products.

This problem results from a mismatch between the present network addressing scheme based on Uniform Resource Locators (URLs), which meet the technical needs of the Internet software, and the needs of human users and site sponsors for simple, user-friendly mnemonic and branded names. This problem is largely hidden in cases where a user finds a site by clicking a pre-coded link (such as after using a search engine), or by using a saved bookmark. However, the problem does seriously affect users wishing to find a site directly, or to tell another person how to find it. To do this, the person must know and type the URL into his Internet browser, typically of the form sitename.com or www.sitename.com. Site sponsors are also seriously hampered by this difficulty in publicizing their sites.

Further, the current method of naming and locating Web sites has serious, widely known problems. Web site locator "domain" names are often not simple or easily remembered or guessed, and often do not correspond to company, trademark, brand or other well-known names.

As a result of the foregoing, site URLs (or domain names) are not intuitively obvious in most cases, and incorrect access attempts waste time and produce cryptic error messages that provide no clue as to what the correct URL might be. A significant percentage of searches are for specific, well-known sites. These could be found much more quickly by a special-purpose locator engine. The current mode of interacting with search engines is also cumbersome-for this purpose, a much simplified mode of direct entry is practical.

One attempt to provide the ability to map a signifier, or alias, to a specific URL utilizes registration of key words, or aliases, which when entered at a specified search engine, will associate the entered key word with the URL of the registered site. One such commercial implementation of this technique is known as NetWord (www.netword.com). However, the NetWord aliases are assigned on a registration basis, that is, owners of web sites pay NetWord a registration fee to be mapped to by a particular key word. As a result, the URL returned by NetWord may have little or no relation to what a user actually would be looking for. Another key word system, RealNames (www.realnames.com), similarly allows web site owners to register, for a fee, one or more "Real-Names" that can be typed into browser incorporating Real-Names' software, in lieu of a URL. Since RealNames also is registration based, there is no guarantee that the URL to which is user is directed will be the one he intended.

Further, in existing preference learning and rating mechanisms, such as collaborative filtering (CF) and relevance feedback (RF), the objective is to evaluate and rank the appeal of the best n out of m sites or pages or documents, where none of the n options are necessarily known to the user in advance, and no specific one is presumed to be intended. It is a matter of interest in any suitable hit, not intent for a specific target. Results may be evaluated in terms of precision (whether "poor" matches are included) and recall (whether "good" matches are not included).

A search for "IBM" may be for the IBM Web site, but it could just as likely be for articles about IBM as a company, or articles with information on IBM-compatible PCs, etc. Typical searches are for information about the search term, and can be satisfied by any number of "relevant" items, any or all of which may be previously unknown to the searcher. In this sense there is no specific target object (page, document, record, etc.), only some open ended set of objects which may be useful with regard to the search term. The discovery search term does not signify a single intended object, but specifies a term (which is an attribute associated with one or more objects) presumed to lead to any number of relevant items. Expert searchers may use searches that specify the subject indirectly, to avoid spurious hits that happen to contain a more direct term. For example, searching for information about the book Gone With The Wind may be better done by searching for Margaret Mitchell, because the title will return too many irrelevant hits that are not about the book itself (but may be desired for some other task).

In other words, the general case of discovery searching that typical search engines are tuned to serve is one where a search is desired to return some number, n, of objects, all of which are relevant. A key performance metric, recall, is the completeness of the set of results returned. The case of a signifier for an object, is the special case of n=1. Only one specific item is sought. Items that are not intended are not desired—their relevance is zero, no matter how good or interesting they may be in another context. The top DirectHit for "Clinton" was a Monica Lewinsky page. That is probably not because people searching for Clinton actually intended to get that page, but because of serendipity and temptation—which is a distraction, if what we want is to find the White House Web site.

In addition,
CF obtains feedback from a group of users in order to serve each given user on an overall, non-contingent basis—without regard to the either the intent of the user at a specific time, or to being requested in a specific context.
RF is used by a single user to provide feedback on their intent at a given time, but still with no presumed intent of a single target.

More broadly, searching techniques are generally not optimized based on using a descriptor which is also an identifier—they provide more generally for the descriptor to specify the nature of the content of the target, not its name. There are options in advanced search techniques which allow specification that the descriptor is actually an identifier, such as for searching by title. Such options may be used to constrain the search when a specific target happens to be intended, but no special provision is made to apply feedback to exploit that particular relationship or its singularity.

Moreover, none of the currently available key word systems utilize heuristic techniques actually to determine the site intended by the user. Instead, the current systems teach away from such an approach by their use of registration, rather than user intention, to assign key words to map to web pages. Thus, the current techniques are not directed to solving the problem of finding the one, correct site for a particular signifier.

Thus, the need exists for a system that would enable a user to find a desired Web document by simply entering an intuitive key word or alias and that would perform a one to one mapping of the alias with the URL actually desired by the user, and which would use heuristic techniques to assist in providing the correct mapping, and improving system accuracy over time.

SUMMARY OF THE INVENTION

In consideration of the above deficiencies of the prior art, it is an object of the present invention to provide a method of signifier mapping that allows a user to locate to a particular network resource, in the preferred embodiment a web page, by simply entering a signifier or alias.

Thus, the present invention is generally directed to a technique for intelligent searching or matching where a signifier is given and is to be related to a name or address of an intended target object.

Signifier, in the context of the present invention means:
an identifier, referent, or synonym for the name or address of a specific resource (a target object) presumed to exist in some domain; but not necessarily a "name" or "address"—a canonical identifier that has been assigned by some authority or pre-set by some convention (names are a subset of signifiers—those which are canonical or pre-established);

not necessarily a description of content or subject matter (concepts or words);

an identifier that has cognitive significance to the user, and presumed communication value in identifying the intended target object to another person or intelligent agent.

In addition, this cognitive/communication value is based on a perceived relationship (meant to have minimal ambiguity) to an identifier, which might be an assigned name or a name based on common usage, but which need not be exact, as long at it serves to signify the intended target.

More generally, descriptors may possibly be considered to be signifiers, if they are intended to be unique or minimally ambiguous (e.g. "the company that commercialized Mosaic" or "the company that sells the ThinkPad").

It is a further object of the present invention to provide a system in which heuristic techniques are used together with user feedback to improve the accuracy of signifier mapping.

None of the many solutions to the signifier mapping problem (Netword, Centraal, Goto, etc.) have identified learning as a valuable technique. This may be because what naturally come to mind are techniques based on pre-defined mappings that make the use of "de jure" explicit registration. That teaches away from the idea of trying to learn the mappings heuristically from colloquial usage. (The same applies to attempts at creating systems for "user friendly names" in other directory systems.) Since the mappings are understood as being defined or registered, why would one try to learn about them? But actually, the mappings are just like natural language—they are dynamic, evolving, and ambiguous, and can only be resolved in terms of learned usage within a context—which is best addressed by learning, as in the present invention, not registration or other static mappings as appear in the prior art.

The use of heuristic, adaptive feedback-based techniques operates in significantly different ways when focused on signifier mapping, and this can be exploited by isolating such tasks. A key difference between the present invention and most common searching tasks is that in the prior searching techniques, there is no intention of a specific target object that is known to exist.

The present invention has several advantageous features, various combinations of which are possible:

1) a special purpose mapping engine for locating popular sites by guessed names;
2) automatic display of the target site (if located with reasonable confidence);
3) an optional simplified mode of direct entry of a guessed site name; and
4) use of user expectations, such as popularity of guesses intended for a given site, as a primary criterion for translating names to sites, with provision for protection of registered trademarks or other mandates.

In accordance with one aspect of the present invention, a finder or locator server is established. The server is configured to work with a user interface that allows users to enter an guessed name or alias, as easily as if the user knew the correct URL for the intended target resource. In response to entry of the alias, the finder server accesses a database that includes, in a preferred embodiment, conventional Web-crawler-derived index information, domain name registration information, as well as user feedback from previous users of the server, and looks up the correct URL, i.e., the one URL that corresponds to the alias and causes the user's browser to go automatically to that URL, without the user having to view and click on a search results page, if the correct URL can be determined with a predetermined degree of confidence.

In one preferred embodiment, the server is structured to accept the alias as a search argument and do a lookup of the correct URL and the return of same to the browser, without the intermediate step of the user having to wait for and then click on a search results web page. The automatic transfer is preferably effected using standard HTML facilities, such as a redirect page or framing. Redirect is effected by placing pre-set redirection pages at the guess URL on the server. Alternately, the redirect page can be generated dynamically by program logic on the server that composes the page when requested.

The present invention advantageously uses feedback and heuristic techniques to improve the accuracy of the determination of the correct URL. If a suggested match is found by the look-up technique and the accuracy of the mapping is confirmed by user feedback, then, after directing the user to the URL, the result is stored in the server to improve the accuracy of subsequent queries. The server database includes a list of expected terms and expected variants that can initially be catalogued to provide for exact matches. This list is updated by the learning processes discussed in more detail below.

If, on the other hand, a probable one intended match cannot be determined, the finder server preferably uses intelligent techniques to find a selection of links to possible matches ranked in order of likelihood, or could return a no-match page with advice, or a conventional search interface or further directories.

According to a preferred embodiment of the invention, each of the selection of links are configured not to go directly to the target URL. Rather, the links are directed back to a redirect server established by the finder server, with coding that specifies the true target, and feedback information. The finder server can in this way keep track of user selections.

In accordance with an advantageous aspect of the invention, such feedback information is used to improve the results of the search by promoting web sites almost universally selected to exact match status, and by improving the ranking of possible lists in accordance with which links are most often selected. Preferably, a confidence parameter can be generated from such tracking to control whether to redirect to a URL or to present a possible list to users.

In furtherance of the above and other objects, there is provided, a designated server, accessible on the Internet, the designated server being configured to respond to relocation requests that specify an identifier, corresponding to a target resource, that may not be directly resolvable by standard Internet Protocol name resolution services to the URL of the target resource. In a direct entry embodiment of the present invention, requests are passed to the relocation server by sending a relocation URL that designates the relocation server as the destination node and appends the identifying information for the identifier as part of a URL string. The relocation server extracts the identifying information and translates it into a valid URL for the target resource. The relocation server is configured, in the event that a unique URL can be determined with respect to the target resource, to cause the target resource to be presented to the user without further action on the part of the user.

Preferably, the user requests are entered at a web browser, the relocation or search server determines the valid URL for the target resource by performing a look-up in a database, and the response from the relocation server is in the form of a redirect page that causes the user's web browser to obtain the target resource.

In accordance with one aspect of the present invention, there is provided a method of finding, in response to entry by a user of a resource identity signifier, a single intended target resource intended by the user to uniquely correspond to the resource identity signifier, among a plurality of resources located on a network comprising a plurality of interconnected computers. The method is for use on a finder server having access to: (a) a database including (i) an index of resources available on the network; and (ii) information regarding user feedback gathered in previous executions of the method by the user and plural previous-users; and (b) a learning system structured to access and learn from information contained in the database. The method comprises: receiving a resource identity signifier from the user; and accessing the database to determine, based on the information in the database, which, if any, of the indexed resources is likely to be the intended target resource. Preferably, the method further comprises directing a computer of the user so as to enable that computer to connect the user to the address of the resource, if any, determined as likely to be the intended target resource.

In accordance with another aspect of the present invention, there is provided an apparatus comprising a finder server having access to: (a) a database including: (i) an index of resources available on network of interconnected computers on which a plurality of resources reside; and (ii) information regarding user feedback gathered in previous operations of the apparatus by a user and plural previous users; and (b) a learning system operable to access and learn from information contained in the database. The finder server is operable to locate, in response to entry by the user of a resource identity signifier, a single intended target resource intended by the user to uniquely correspond to the resource identity signifier, from among a plurality of resources located on the network, by: receiving a resource identity signifier from the user; and accessing the database to determine, based on the information in the database, which, if any, of the indexed resources is likely to be the intended target resource. Preferably, a computer of the user is directed so as to cause that computer to connect the user to the address of the resource, if any, determined to be the intended target resource.

In accordance with yet another aspect of the present invention, there is provided a system for finding, in response to entry by a user of a resource identity signifier, a single intended target resource intended by the user to uniquely correspond to the resource identity signifier, among a plurality of resources located on a network comprising a plurality of interconnected computers. The system comprises: finder server means having access to: (a) database means for storing an index of resources available on the network; and information regarding user feedback gathered in previous executions of the system by the user and plural previous users; and (b) learning system means for accessing and learning from information contained on the database; receiving means for receiving a resource identity signifier from the user; and accessing means for accessing the database means to determine which, if any, of the indexed resources is likely to be the desired target resource. Preferably, the system further comprises directing means for directing a computer of the user so as to cause that computer to connect the user to the address of the resource, if any, determined in the access means to be the target resource.

In accordance with still another aspect of the present invention, there is provided a computer-readable storage medium storing code for causing a processor-controlled finder server having access to: (a) a database including (i) an index of resources available on the network; and (ii) information regarding user feedback gathered in previous executions of the finder server by a user and plural previous users; and (b) a learning system structured to access and learn from information contained on the database, to perform a method of finding, in response to entry by a user of a resource identity signifier, a single intended target resource intended by the user to uniquely correspond to the resource identity signifier, among a plurality of resources located on a network comprising a plurality of interconnected computers. The method comprises: receiving a resource identity signifier from the user; and accessing the database to determine, based on the information in the database, which, if any, of the indexed resources is likely to be the intended target resource. Preferably, the method further comprises the step of: directing a computer of the user so as to cause that computer to connect the user to the address of the resource, if any, determined as likely to be the intended target resource.

In accordance with another aspect of the present invention, there is provided a system for finding resources on a network of interconnected computers on which a plurality of resources reside. The system comprises: a client terminal operated by a user, the client terminal allowing the user to connect to resources located on the network; and a finder server having access to: (a) a database including: (i) an index of resources available on the network; and (ii) information regarding user feedback gathered in previous operations of the system by the user and plural previous users; and (b) a learning system operable to access and learn from information contained in the database. The finder server is operable to locate, in response to entry by the user of a resource identity signifier, a single intended target resource intended by the user to uniquely correspond to the resource identity signifier, from among a plurality of resources located on the network, by: receiving a resource identity signifier from the user; accessing the database to determine, based on the information in the database, which, if any, of the indexed resources is likely to be the intended target resource; and directing a computer of the user so as to cause that computer to connect the user to the address of the resource, if any, determined as likely to be the intended target resource.

In accordance with another aspect of the present invention, there is provided a method of identifying, in response to entry by a user of an object identity signifier, a single intended object to be acted upon, the single intended object being intended by the user to uniquely correspond to the object identity signifier, among a plurality of possible objects. The method is for use on a computer having access to: (a) a database including (i) an index of possible objects; and (ii) information regarding user feedback gathered in previous executions of the method by the user and plural previous users; and (b) a learning system structured to access and learn from information contained in the database. The method comprising: receiving an object identity signifier from the user; and accessing the database to determine, based upon the information in the database, which, if any, of the indexed objects is likely to be the object intended to be acted upon.

In accordance with another aspect of the present invention, there is provided an apparatus for identifying, in response to entry by a user of an object identity signifier, a single intended object to be acted upon, the single intended object being intended by the user to uniquely correspond to the object identity signifier, among a plurality of possible objects. The apparatus comprises: a computer having access to: (a) a database including (i) an index of possible objects; and (ii) information regarding user feedback gathered in previous executions of the method by the user and plural previous users; and (b) a learning system structured to access and learn from information contained in the database, the apparatus being operable to: receive an object identity signifier from the user; and access the database to determine, based upon the information in the database, which, if any, of the indexed objects is likely to be the object intended to be acted upon.

BRIEF DESCRIPTION OF THE DRAWINGS

FIG. 3 shows an example of a database entry for the finder server of the present invention;

DETAILED DESCRIPTION OF THE DISCLOSED EMBODIMENTS

"Population Cybernetics" and the Internet

Figure 1A:
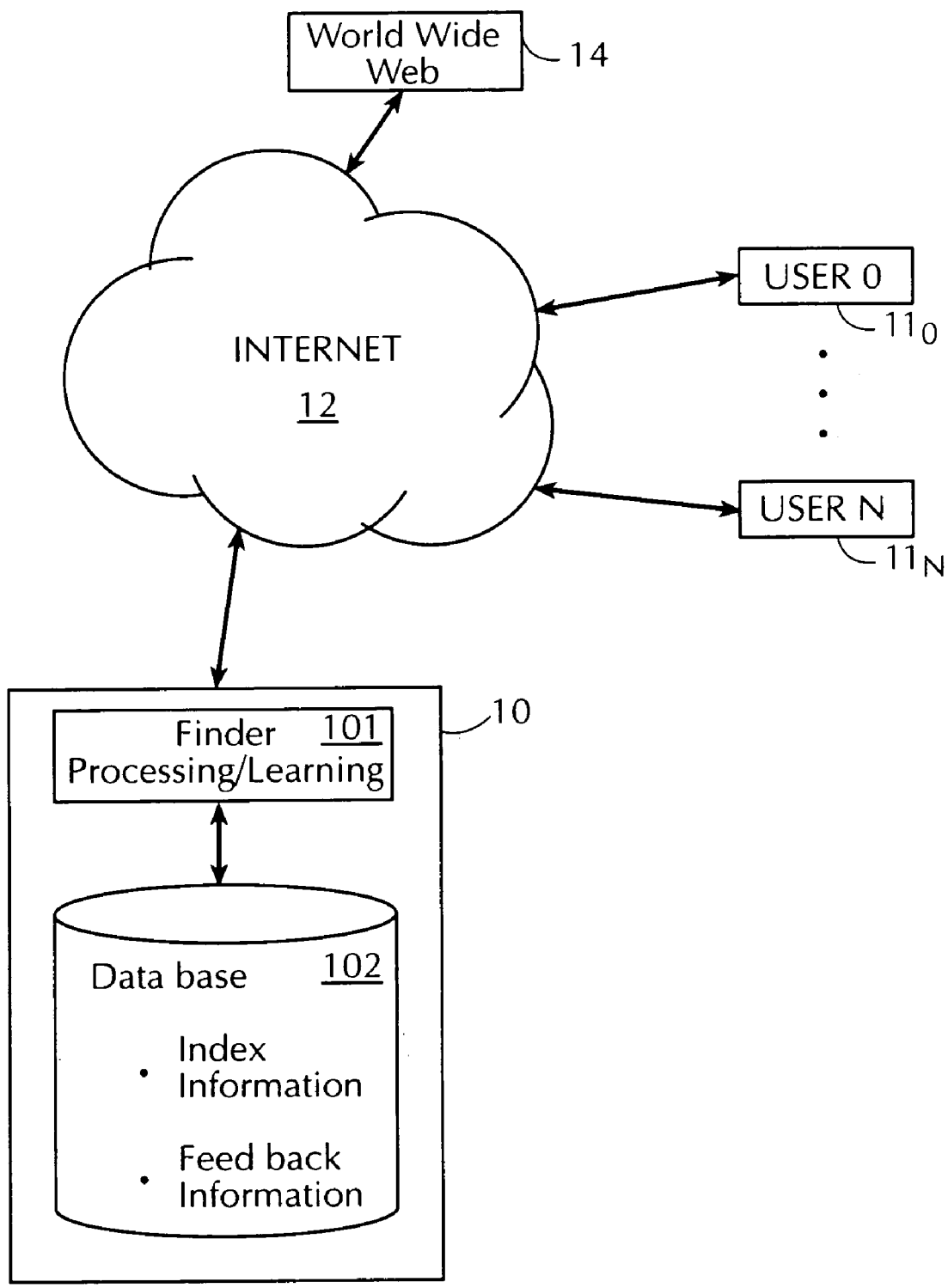
FIG. 1A is an architectural block diagram of a server computer system internetworked through the Internet in accordance with a preferred embodiment of the present invention.

As a general matter, the present invention relates to a technique that collects experience (a knowledge base) from a mass population that is open ended or universal, either over all domains, or over some definable subject or interest domain or strata. This represents a significant improvement over prior art techniques, which are generally limited in the scope of the population and extent of experience from which they draw their knowledge base.

The technique of the present invention, in a preferred embodiment, uses the Internet to do this in a way that is powerful, economical, and far-reaching. The technique, in the preferred embodiment, uses the Internet to enable collection and maintenance of a far more complete knowledge base than has been used with any prior technique except Collaborative Filtering (CF).

In the present invention feedback learning is advantageously utilized, so that the information is not just collected, but refined based on feedback on the accuracy of prior inferences.

In its broad sense the present invention constitutes a kind of "population cybernetics," in that the learning does not just collect a linear knowledge base, but uses a feedback loop control process to amplify and converge it based on the results of prior inferences, and that it works over an entire population that is open, infinite, and inclusive. This is in contrast to prior learning techniques, which draw on necessarily finite, closed populations.

The use of population group information to achieve signifier mapping differs from the prior art technique of collaborative filtering in at least the following manner:

Whereas both CF and the technique of the present invention draw on knowledge of a population group to make inferences, CF obtains ratings of many things by many people to suggest other things (that may also be highly rated by the user, based on correlation with the group), and CF does not involve a specific input request, but rather seeks a new, previously unknown item in a category. On the other hand, the present invention obtains translations of many signifiers by many people to suggest the intended translation of a signifier and involves a specific input request to be translated to identify a known intended target Although the technique of signifier mapping will occasionally be referred to loosely as searching, it is more accurately translation, because the target is intended and known, just not well specified. This differs from typical Web or document searching, which typically seeks unknown, new items.

The technique of the present invention also differs from natural language (NL) translation or understanding, in that the input has no context as part of a body of discourse (a text). NL understanding techniques on the other hand translate words as components of concepts embedded in texts having a context of related ideas. Thus the cues of context in a discourse are absent, and the translation must be done without any such cues, although knowledge of the user may provide a useful context of behavior, demographics, psychographics that has some value in inferring intent, and knowledge of the user's prior requests may provide additional useful context information. The task is to infer or predict intention, rather than to understand meaning, because there is no basis to infer meaning in any conceptual sense. The input is disjointed from any surrounding context, and if not seen before (from the user or others), there is little useful information on either its meaning or intention. The present invention seeks to infer intention based on limited data, primarily the input request, and draws on group data (of request translations) as its strength.

The task of the present invention has similarities with cryptanalysis, in that both the present invention and cryptanalysis use data about communications behavior from groups of communicators to make inferences. However the task differs in that Cryptanalysis deals with intentional hiding of meaning or intention, where the technique of the present invention is applied to cases where the hiding (of the intention of a signifier) is not at all intended; and Cryptanalysis seeks to infer meaning (ideas) drawing on context in a discourse, like NL understanding, not usually to infer the intention of a signifier (of objects or actions) which is not in a context.

This point of intention versus meaning is subtle, but has to do with communication of commands or requests as opposed to concepts.

One view of this is the idea of "requests," as opposed to declarations or assertions, in the use of language.

This task of recognizing commands (vs. meanings) has parallels in the task of robot control, such as that based on spoken commands. The similarity is in training understanding of the speech of many users to be speaker independent, and to infer meanings of a current speaker from that of others. The difference is that the tasks addressed in the present invention deal with a very wide, effectively infinite universe of commands (intended objects), while robot control techniques have generally been limited to very small sets of commands (partly because of the inability to apply mass experience).

Thus the technique of the present invention could be viewed as addressing a special class of robot control (in which experience data and feedback is accessible), and may ultimately be extensible to other robot control applications as such data becomes accessible over the network.

The social dimension is critical for inferences relating to shared objects or resources. Names draw on social conventions and shared usage. This social usage information is essential to effective mapping of signifiers to resources. De-jure naming systems can underlie a naming system, as for current Internet domain names, but de-facto usage is the essential observable source of information for fullest use. De-jure systems suffer from entropy, corruption and substitution, while de-facto usage is pragmatic and convergent to changing usage patterns.

This applies to a variety of name-able resources:
Web domain names;
Web sub-site names (such as to find sub-areas);
People or business names;
Department, agent, or service identifiers (such as to to find contact points);
Policy capability specifications (such as to find permissions, such as someone who can provide access to a given resource for a given purpose, such as confirming employment status or update-access to a report);
Information sets or collections (to find reference tools that are known to exist, such as an IBM dictionary of acronyms, or an index of papers in ACM publications);
Other robot control tasks, as social experience and feedback becomes accessible.

Social usage information can be combined with other sources of information in a heuristic fashion. For example, there could be a hierarchy that might be used in order, as available:
1. Personal defined usage information, such a defined personal nicknames;
2. Public de-jure defined mappings or directories;
3. Personal usage information (a person's own undefined nicknames, learned from that person's own usage/feedback);
4. Social de-facto usage information;

This is just one possible sequence, but shows how the usage data can take searching beyond what has been defined.

As discussed above, a preferred embodiment of the present invention relates to a method and apparatus for locating a desired target resource located and accessible on a network, in response to user entry of a guessed name or alias. In illustrating the preferred embodiment, the apparatus is shown as a server computer, or computers, located as a node on the Internet. However, the present invention is in no way limited to use on the Internet and will be useful on any network having addressable resources. Even more broadly, the present invention is useful for any similar task of identifying an intended target for an action in which automatic facilitation of that action is desired, where feedback from a large population can be obtained to learn whether a given response was in fact the one that was desired. Control of robots, as discussed herein, is one example of such broader application.

The finder server of the preferred embodiment of the present invention allows users to enter a guessed identifier or alias, as easily as if they knew the correct URL. Specifically, the finder server of the present invention accepts a guessed name, or alias, from a user, uses a look-up technique, enhanced by heuristics preferably taking into account previous users' actions, to determine a correct URL for the intended target resource, and causes the user's browser to go to that URL automatically. Preferably this is done without the added step of first viewing and clicking on a search-results page, where an initial search finds the intended target resource with a predetermined degree of certainty. Such a resource will be referred to hereinafter as a "probable". In accordance with a preferred embodiment of the present invention, this functionality can be implemented by:

Publicizing the locator server under an appropriate URL name, for example, guessfinder.com.

Setting up the server to, in response to entry of a guessed name or alias, do a lookup to the correct URL and return a response that causes the user's browser to go automatically to the specified URL. Such an automatic transfer can be effected using a standard HTML facilities, such as a redirect page, or framing.

If the guess does not provide an exact match in the lookup phase, using feedback and heuristic techniques to create and present to the user a selection of links to possible matches. Alternately, the user may be presented with a nomatch page with advice, or directed to a conventional search interface, or further directories.

It is contemplated that the use of aliases for attempting to locate a web site associated with company name or brand name would be found useful. For example, the aliases "s&p", "s-p", "sandp", "snp", "standardandpoors", "standardnpoors", "standardpoors" should preferably all map to www.standardpoors.com. In addition to companies and brands, other important name domains would include publications, music groups, sports teams, and TV shows.

The present invention advantageously provides for learning and feedback on the basis of user preferences to automatically and dynamically build a directory of names and sites that maps to the actual expectations and intentions of a large population of users, and adapts to changes over time, including the appearance of new sites, thus optimizing utility to them.

The finder server of the present invention effectively provides a secondary name space, administered by the organization operating the finder system, through the automated heuristic methods described here, that maps to, but is not dependent on, the URL name space. The finder site computer has access to a data base containing entries for any number of popular sites, with any number of likely guesses and variations for each site.

As a result of the service provided when the present invention is implemented, site sponsors could skip the cumbersome and costly process of obtaining specific mnemonic URLs or alternate URLs in many cases (especially with regard to domain names). Even with a number of conventional URLs, this service could be a supplement, for additional variations. The problem of pre-empted URL domain names would also be avoided, except where there is legitimate and significant pre-existing usage.

A key to utility is to be able to directly connect in response to most guesses, and ambiguities could be a limiting factor. To avoid that it is desirable to exploit Pareto's Law/the 80-20 rule and do a direct connect even when there is an uncertain but likely target. For that to be useful, it must be easy for users to deal with false positives.

Correction after arrival at a wrong site can be made relatively painless by allowing a subsequent request to indicate an error in a way that ties to the prior request and adds information. For example a request, guessfinder.com/lionking, that located the movie but was meant to find the play could be corrected by entering guessfinder.com/lionking/play. A more efficient coding might explicitly indicate an error, such as guessfinder.com/!/lionking/play. Even with the error, this would be quicker and easier than conventional methods. Note that this example was illustrated with the direct URL coding techniques described below. Similar post-arrival corrections can be made with other user interface techniques, such as a frame header that includes appropriate user interface controls to report feedback, much as conventional search engines allow for "refinement" of prior searches, also described below.

Correction in-flight can be achieved by using the existing visibility of the redirect page, or enhancing it. When a redirect page is received by a user's browser, it appears for a short time (as specified with an HTML refresh parameter) while the target page is being obtained. In addition to affording a way to optionally present revenue-generating (interstitial) advertising content, that page preferably lists the redirection target, as well as alternatives, allowing the user to see the resolution in time to interrupt it.

This is most useful with a browser that permits a redirect to be stopped in mid-stream by clicking the stop button, leaving the redirect page on display, and allowing a correct selection among alternative links to be made. Alternately, a multi-frame (multi-pane) display could be used to allow a control frame to remain visible while the target page is loading in a results frame, as described below.

Note some of the typical parameters and control points that would be relevant:

"New" sites.

Applies when the user wants a site but is provided neither a direct hit, nor a correct possible. Users would find the site via alternate means (offered through the service or not). The user then submits an add-site request, via the Web or e-mail. If the number of add-site requests over a set interval exceeds a set (low) threshold, the site is added as a possible, or a direct hit if there are no competing alternatives. Such adds would be provisional, and could be dropped if requests are not sustained.

Possibles

Low confidence possibles would be listed low on the list, and selections would be tracked. If selections are strong, they move up the list. If selections are very weak, they would drop off after some interval. The threshold to add back sites that were dropped might be higher for a time, to limit oscillation and false adds. If possibles are well ahead of alternatives by some threshold over some interval, they would be promoted to direct hits.

Direct Hits

Feedback on false positives would be collected. This could be via links in frames, redirect pages, interstitials, or other means, as suggested previously. If false positives exceed a threshold, the site would revert to a possible and the common alternatives would be listed as well.

Parameter Issues: Thresholds, Intervals, Smoothing, Damping, Overrides.

Basic parameters include the various thresholds and time intervals for measurement. Smoothing techniques (such as exponential smoothing) would be applied to adjust for random variations and spikes, to improve forecasting. Damping mechanisms could be used to limit undue oscillation from state to state. Overrides would provide for mandated or priority matches, such as for registered trademarks, on either a weighted or absolute basis, as appropriate.

FIG. 1A illustrates a first embodiment of the present invention, as implemented on the Internet. The finder server 10 includes a computer or computers that perform processing, communication, and data storage to implement the finder service. Finder server 10 includes a finder processing/learning module 101. Module 101 performs various processing functions, and includes a communication interface to transmit and receive to and from the Internet 12, as well as with database 102, and is programmed to be operable to learn from experiential feedback data by executing heuristic algorithms. Database 102 stores, in a preferred embodiment, indexes of URL data that would allow the module 101 to locate, with a high degree of confidence, a URL on the Web that is an exact match for a target resource in response to a user's entry of an alias or guessed name. Preferably, the indexes store, in addition to available URL information, such as domain name directories, information relating to the experience of the server in previous executions of the finder service. As the server gains experience and user feedback, heuristic techniques are applied by module 101 to enable the returned URLs to conform more and more accurately to user expectations.

Users $11_0$–$11_N$ can access the Internet 12 by means of client computers (not shown) either directly or through an Internet service provider (ISP). As has been discussed previously, to make use of the present invention the user enters a guessed name, or alias, into his computer's browser and submits a query containing the alias to the finder server. The World Wide Web 14 includes computers supporting HTTP protocol connected to the Internet, each computer having associated therewith one or more URLs, each of which forming the address of a target resource. Other Internet information sources, including FTP, Gopher and other static information sources are not shown in the figure.

The finder server includes operating system servers for external communications with the Internet and with resources accessible over the Internet. Although the present invention is particularly useful in mapping to Internet resources, as was discussed above, the method and apparatus of the present invention can be utilized with any network having distributed resources.

Entry of the alias by a user may be accomplished in a number of ways. In one embodiment, a usage convention can be publicized for passing the alias to the server within a URL string, such as guessfinder.com/get?ibm, for example, for trying to find the web page corresponding to the alias "ibm". In this case, the server is programmed to treat the string "ibm" as a search argument and perform the appropriate processing to map the alias to the intended target resource. A similar effect can be obtained by the somewhat simpler form guessfinder.com/ibm, if the server is programmed appropriately. Alternately, the user can visit the web site of the finder server and be presented with a search form, as is done in conventional search engines. A third option is to provide a browser plug in that allows direct entry of the key word in the browser's URL window or any alternative local user interface control that will then pass the entry on as a suitably formatted HTTP request.

It also would be preferable for an enhanced user interface to be phased in as the service gains popularity. This preferably would be accomplished by a browser plug-in, or modifications to the browser itself, to allow the alias to be typed into the URL entry box without need for the service domain name prefix (such as, guessfinder.com/ . . . ). Instead, such an entry would be recognized as a alias, not a URL, and the prefix would be appended automatically, just as http:// . . . is appended if not entered with a URL in current browsers.

Figure 1B:
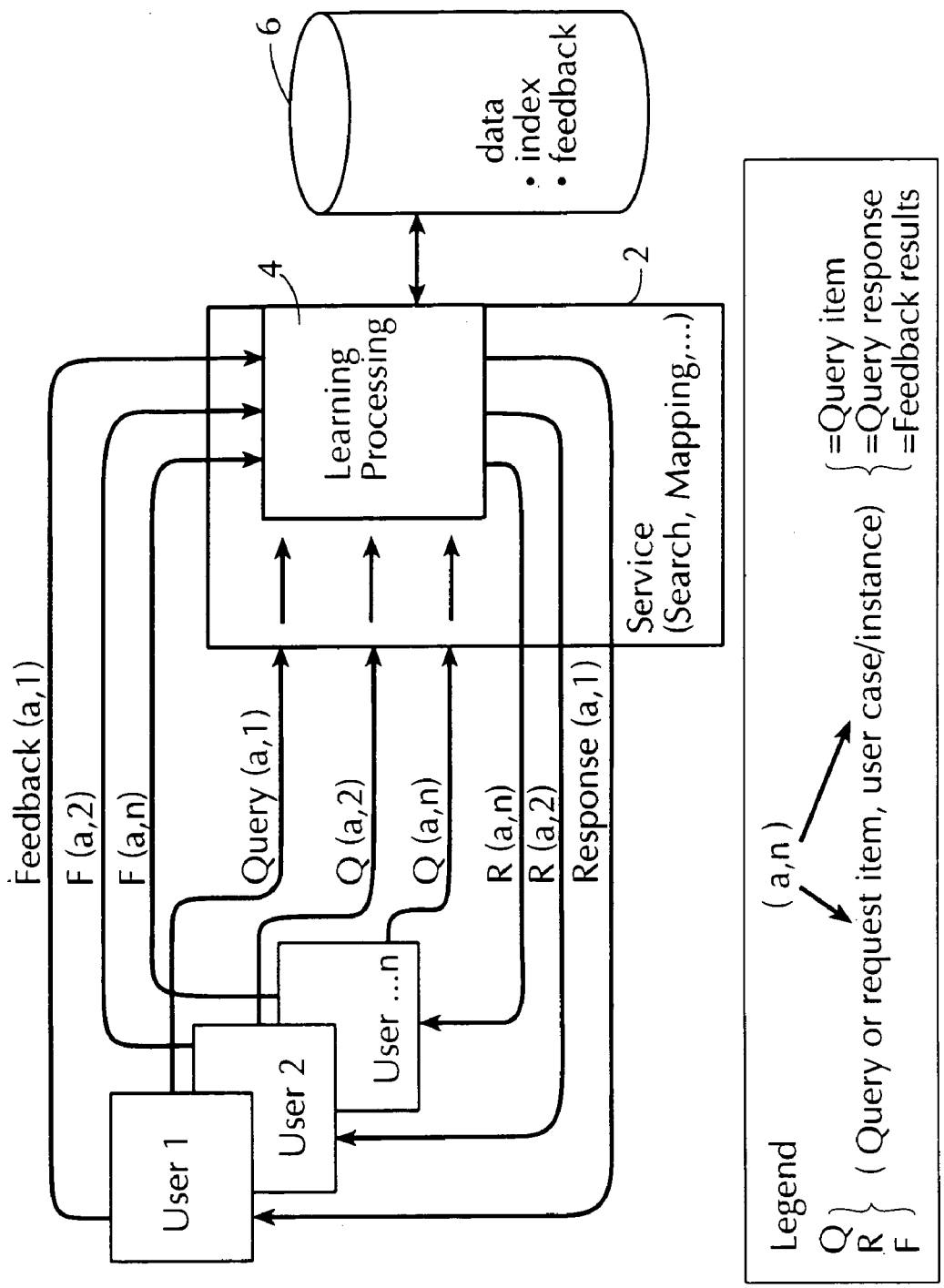
FIG. 1B is a flow diagram illustrating a method of obtaining feedback from multiple users to be applied in searching or signifier mapping.

FIG. 1B is a flow diagram illustrating a technique for obtaining and learning from feedback responses gathered from a large group of people, in the example, users 1, 2, . . . n. Such a technique can be used in a variety of applications, and in particular in traditional search engines, or in mapping to identify particular web sites, as in alias or signifier mapping.

In FIG. 1B, users 1, 2, . . . n represent a large community of users. In the flow diagram, the flow of query items from the users is indicated by a Q, the flow of responses back to the users is indicated by an R, and the flow of feedback results-provided by the users' actions, or responses to inquiries, is indicated by an F. As can be seen from the figure, Query (a, 1) is transmitted from user 1 to the service 2, which can either be a searching or a mapping service. The service has learning processor 4, which interfaces with a database 6. The database 6 contains, among other things, indexes and feedback information gathered from previous queries. In response to the query, the user 1 is provided with a response R(a, 1). User 1 then is provided with the opportunity to transmit user Feedback (a, 1) to the Service 2. Learning processor 4 stores the feedback information in the database 6, and is programmed with one or more heuristic algorithms enabling it to learn from the feedback information to improve the returned search or mapping results. The feedback provided will improve the results offered, for example by positively weighting results preferred by users, so that, over time, more accurate results can be obtained.

Figure 2:
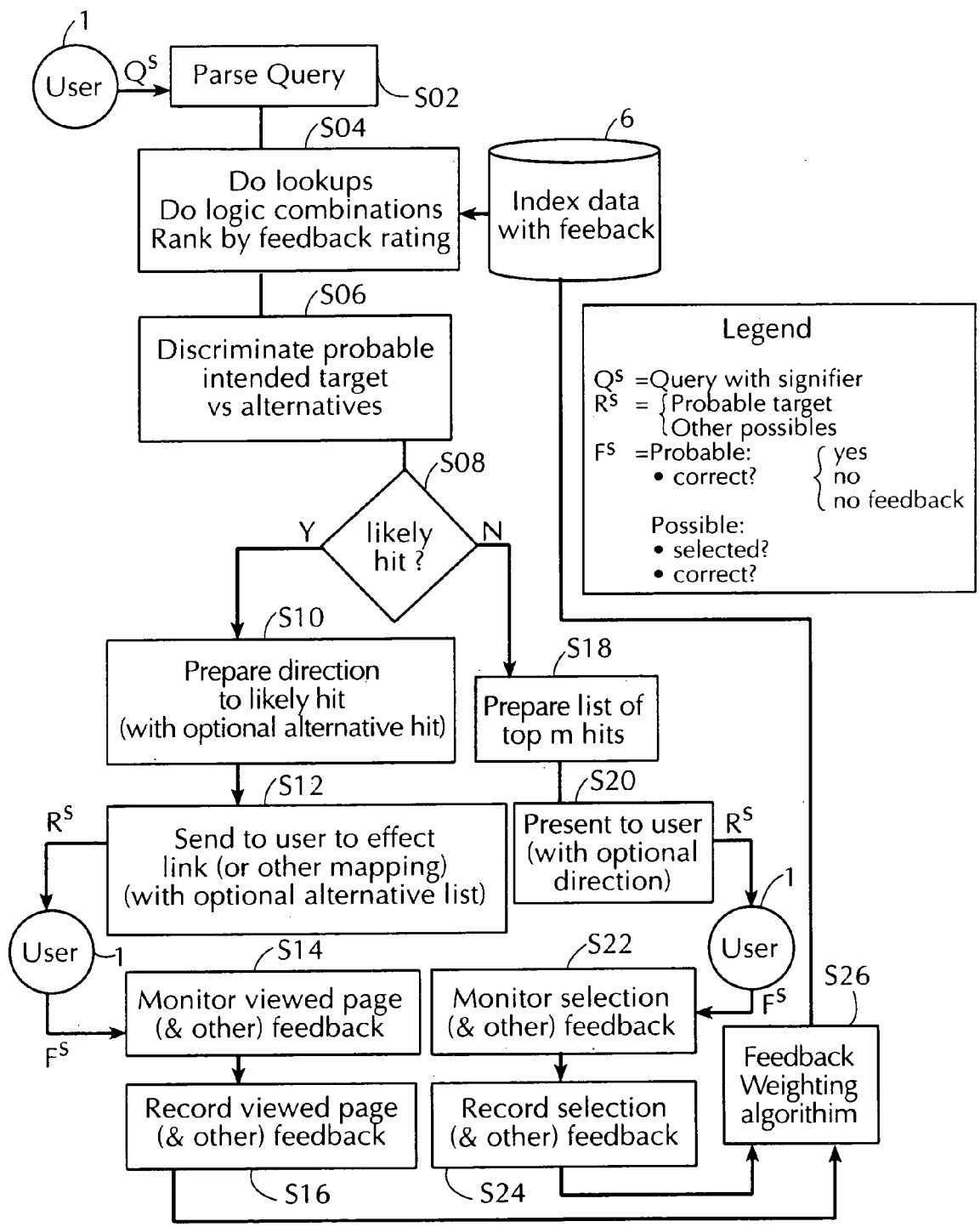
FIG. 2 is flow diagram showing a method of signifier mapping using feedback and heuristics to continually improve the performance of the mapping.

FIG. 2 is a diagram illustrating the logical flow used in applying the general technique of learning from user feedback shown in FIG. 1 to signifier mapping, in accordance with a preferred embodiment of the present invention. A user enters a Query consisting of a signifier, represented by $Q^s$. The server, in response to receipt of the query, parses the query, at step S02, and in step S04 performs a database lookup in an attempt to determine, if possible, the exact target resource intended by the user. Database 6 includes index data as well as feedback data obtained from users in previous iterations of the signifier mapping program, is accessed. The stored data structure is described in more detail below.

In step S06, the program discriminates a probable intended target making use of the index information such as domain registration indexes, and other resources, as well as the feedback information stored in the database. In step S08, if a likely hit, or exact match has been identified, that is, a web page has been located with a high confidence parameter, the flow continues to step S10. At step S10, a direction is prepared to the likely hit URL. A list of alternatives optionally may be provided for presentation to the user at the same time, in case the likely hit turns out not to be the target identifier. At step S12, the server sends information $R^S$ to the user, more particularly to the user's browser, to effect a link to the likely hit. Optionally, the alternate list is also provided at the same time.

In step S14, the viewed page is monitored by the server and the user, by his actions, provides feedback. Most readily determined with no assistance from the user is the fact of the user having chosen the link. This may be determined, for example by a redirect, in which an intermediate server is transparently interposed between the browser and the target page, and thus able to identify the user and the URL target based on coding built into the URL that the user clicks. Also desirable is the amount of time the user spends at the site, which will be an indicator of whether the site is the intended target. This may be ascertained, for example, if clickstream data can be obtained, such as through the use of a monitor program that works as a browser add-in or Web accessory, such as the techniques offered by Alexa. Other feedback can be provided by asking the user. This can, for example, be done conveniently by using a small header frame served by the relocation service that appears above the actual target page, and that includes controls for the user to indicate whether or not the results were correct. The URL of the viewed page is recorded, together with any other feedback, for use in improving the accuracy of subsequent iterations of signifier mapping. At step S26, the feedback data is supplied to a feedback weighting algorithm, described in detail below, which generates appropriate weighting factors to be stored in the database for use in subsequent mappings.

If it is determined at step S08 that the result is not a likely hit, the flow proceeds to step S18, where a list of the top m hits (m being a predetermined cutoff number), preferably drawing on the list of possible hits from a conventional search engine, or by employing the same techniques as a conventional search engine, is prepared. Unlike conventional search engines, the ranking of these hits is based primarily on experience feedback data as described below. In addition, where such feedback is limited or absent, it would be supplemented by variants of more conventional search engine weighting rules that are expressly tuned to the task of finding a single intended result (i.e., high relevance by low recall) rather than many results (high relevance plus high recall). The list is presented, at step S20, to the user as $R^S$. The user, by the selections made from the provided list, and from other feedback, such as how long the user spends at each link, supplies feedback to the system. This information $F^s$ is monitored, at step S22 and recorded, at step S24. The recorded information is supplied to the feedback weighting algorithm, at step S26, the output of which is stored in the database for use in subsequent iterations of the signifier mapping.

FIG. 2 illustrates the simple case in which a user is directed to a target URL if the target has been determined to be a probable hit, and is presented with a list to choose from if the target cannot be identified with sufficient certainty. However, it is well within the intended scope of the invention for alternate methods to be employed. For example, the user interface (UI) could be extended, either by framing, or a browser plug-in or extension, to provide multi-pane/multi-window results that allow a pane for each type of response, e.g., the target response and a list of possibles, regardless of the level of confidence in the result. In such a case, the format for presentation of results would be the same whether a probable has been located or not, but the learning from feedback and ranking would still seek to determines "correctness" based on the varying feedback cases.

FIG. 3 illustrates a preferred method of organizing index data to allow for storing and updating of the most probable hits for a given query. As can be seen from the illustration, for each query, whether single element queries or compound queries, there is stored a list of associated possible targets. Linked to each of these query/target pairs is a raw score, an experience level, and a probability factor. As feedback enters the system, the index data is updated to reflect the user feedback. The updating process will be described below. While the index shows preferred weighting criteria, these are only a sample of the kind of criteria that can be correlated to the query/target pairs. In a simple embodiment, the raw score would be based only on selections of hits, and explicit feedback on correctness as described below. Other embodiments could add feedback data on time spent at a target. Additional variations would include weighting based on the recency of the feedback, and on the inclusion of non-feedback data, such as the various syntactic and semantic criteria used for relevance weighting by conventional search engines.

The process of maintaining the guess-target database is adaptable to a high degree of automation, and this can be highly responsive to new sites. An outline of such a method is:

All guesses are logged and analyzed.
Ambiguous hits are tracked as described earlier.
Complete non-matches are sorted by frequency to identify common new requests (in real time). Changes in ambiguous match patterns could also flag appearance of new sites.
Common new requests preferably are fed to an automated search tool that would use existing search engines, hot site lists, and name registration servers, etc. to identify possible targets.
Automated intelligent analysis of those results can seek to qualify probable targets.
High confidence (or possible) targets preferably are added, and then tracked based on the feedback mechanism described earlier, in order to self-correct. A confidence parameter preferably is used to control whether to redirect or to present a possibles list to users.
Human review and correction also preferably is used to supplement this.

Figure 4A:
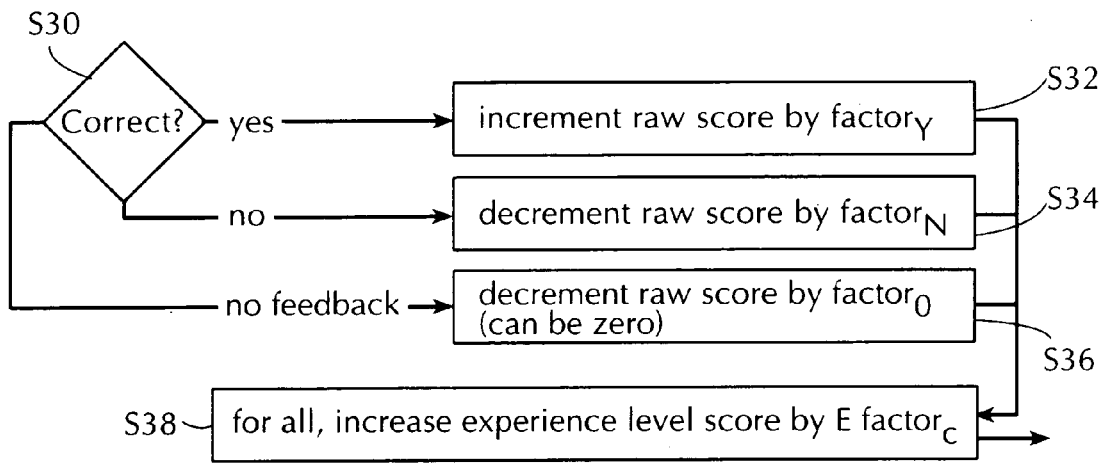
FIG. 4A is a flow diagram illustrating a technique of feedback weighting for probable results in signifier mapping.

FIG. 4A illustrates a preferred technique for weighting the results using feedback data for hits that have been determined to be probable hits. In step S30, if the user feedback from the probable result indicates that the probable was in fact the target URL the user was searching for, the flow proceeds to step S32 where the raw score for that query/target pair is incremented by factor$_N$. If the user returns feedback indicating that the probable was not the target resource the user had in mind, the flow proceeds to step S34 where the raw score for that query/target pair is decremented by factor$_N$. If the user provides no feedback, then the flow proceeds to step S36 where the raw score is decremented by factor$_o$, which can be zero. After execution of any of steps S32, S34 or S36, the flow proceeds to step S38, at which the experience level score is incremented by Efactor$_C$.

Figure 4B:
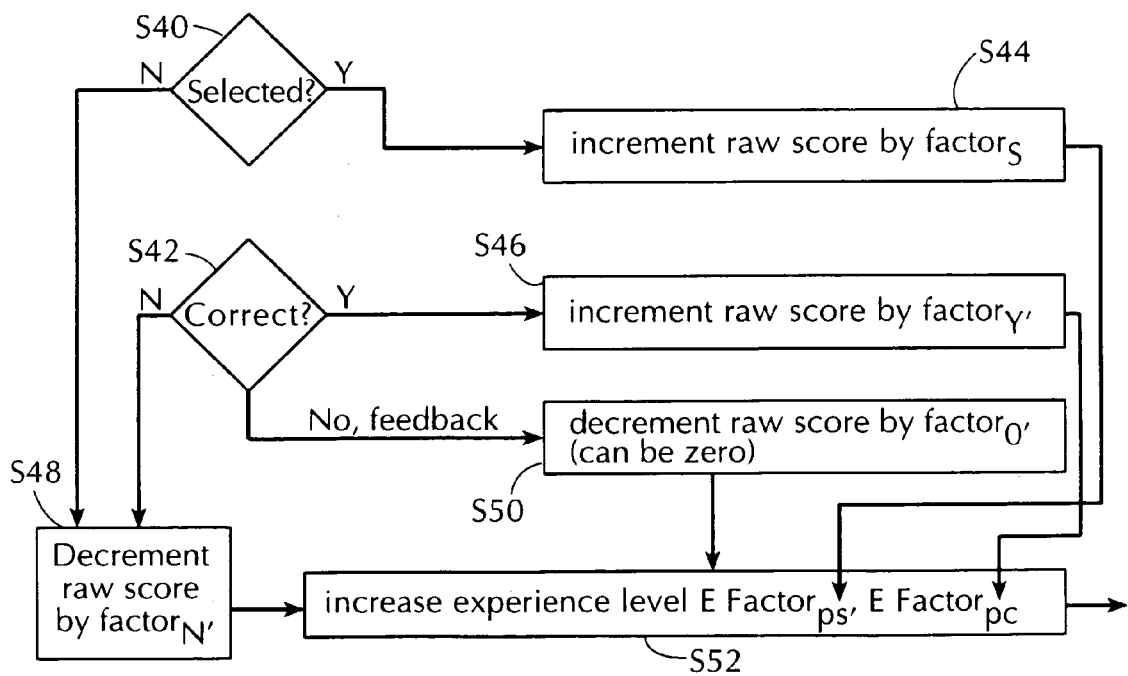
FIG. 4B is a flow diagram illustrating a technique of feedback weighting for possible results in signifier mapping.

FIG. 4B illustrates a preferred technique for weighting in accordance with user feedback in the case of possibles, i.e., items on the list presented to the user when no probable result can be located. As shown in the figure, if a possible is selected by the user from the presented list, at step S40, the fact of selection is recognized, preferably by use of a redirect server that allows the system to keep track of which link was chosen. Additionally, the amount of time the user spends at the selected link may be ascertained. Making use of the information gathered in the redirect and such other feedback as may be obtained, the raw score for the query/target pair is incremented, at step S44, by factors. The user is then requested to provide additional feedback after the user has finished viewing the link.

In a preferred embodiment of the present invention, this feedback is gathered from the user by presenting the user with a frame that includes a mechanism, such as a check box, or radio button, that allows the user to indicate whether the selected possible was in fact the intended or "correct" target resource. If it is determined, at step S42, from the feedback that the link was the correct target, the flow proceeds to step S46, where the raw score for that query/target pair is incremented by factor$_Y$. If the user returns a negative response, the raw score of the pair is decremented at step S48 by a by factor$_N$. If no feedback is received, the raw score is decremented, at step S50, by factor$_o$, which can be zero. After execution of any of steps S44, S46, S48 or S50, the flow proceeds to step S52, at which the experience level score is incremented by Efactor$_{PS}$ in the case of selection of the link, and by Efactor$_{PC}$ if the link was the correct.

Figure 5:
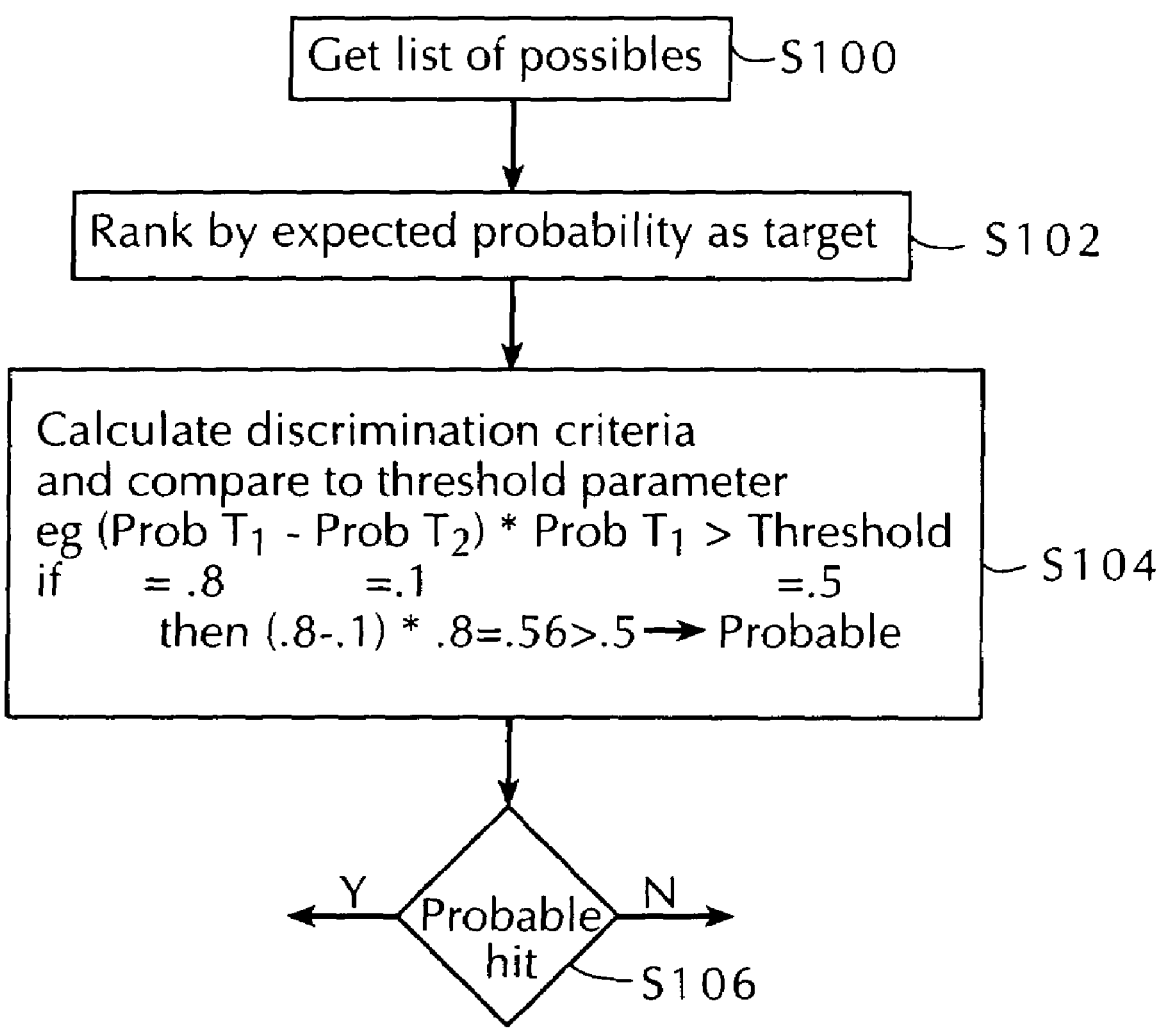
FIG. 5 is a flow diagram illustrating how feedback is used in a preferred embodiment to discriminate a probable target resource in accordance with the present invention.

FIG. 5 illustrates a detail of how the present invention ranks and discriminates a probable target.

At step S100 a list of possibles is obtained. Next, the list is ranked, at step S102, on the basis of the expected probability as the target. In step S104, a discrimination criteria is calculated and compared with a predetermined threshold parameter. For example, if ProbTi is the expected probability that Ti is the correct target, a formula such as the example shown can be used to determine whether T1 stands out as more probable than T2 by a relative margin that exceeds a set threshold needed to judge it as the probable intended one target. When the threshold is not exceeded, the implication is that one of the secondary possibilities may very well be the intended one, and that directing the user to the slightly favored target may not be desirable.

In the preferred embodiment, when a link on a list of possibles is selected by the user, rather than connect the user immediately to the chosen link, the finder server first redirects the user to a redirect server where feedback data relating to the selection can be gathered. One item of feedback that may be obtained in this manner is the very fact of the selection. Further feedback can be obtained by additional means, such as monitoring how long the user spends at the selected link, and by directly querying the user.

The redirect linking technique uses the target URL as a server parameter within a composite URL to control the intermediate server parameter within the URL to control the intermediate server. The target URL is embedded as a server parameter within a URL that addresses the redirect server, and the URL parameter is used to control the intermediate server process. Thus a server is called with a first URL, a redirect URL, that specifies the second URL, i.e., the target URL, as a parameter. For example http://redirector.com/redirector?query12345678/targetserver.com/targetpath1/targetpage1.htm where redirector.com is the intermediate server URL, query12345678 is a unique identifier of the user-query combination, and targetserver.com/targetpath1/targetpage1.htm is the target URL. The network ignores the parameter portion of the URL, which is passed as data to the server. The server acts on the parameter to perform desired intermediary processing, in this case, the logging of the fact that this link was clicked in response to query12345678, and to redirect the user to the intended location specified by the second URL. The token query12345678 could be a unique identifier corresponding to a logged user-query entry, or it could be the actual query string.

The delay required for the redirect provides the opportunity for the display of interstitial advertisements. In addition, additional user feedback can be solicited during the delay, and the connection to the targeted URL can be aborted if the user indicates that the target site is not the one he or she intended. In addition to using the redirect when a link is selected, the technique also preferably is used when an exact match is found, to provide a brief delay before connecting the user to the exact match, to present advertisements to give the user the time to abort the connection. In any event, the user preferably is given the opportunity to provide feedback after connecting to any site, whether directly as a result of an exact match, or as a result of selecting from a linked possibles list.

The redirect server of the present invention allows data to be gathered on each link as it is followed and redirected. The redirect link can be created in a simple static HTML. However, it is preferable to create the link dynamically for each user selection.

The finder is setup to recognize the feedback function, possibly as a CGI or other gateway/API function, and invoke the appropriate function to parse the URL or other data (referer, cookies, etc.), extract the target URL and feedback information for processing, and return a page containing a redirect (or use framing or other means) to take the user to the desired target.

This mechanism is general, and can be used for many purposes. In the case of the finder server:

Reasonably complex feedback information can be obtained, which at minimum would include the original guess. Thus a log of each guess that was not clearly resolved, paired with the corresponding user-selected target, can be obtained.

That set of selected guess/target pairs can then be used to adjust the confidence levels in the guess/target database. Similar data on directly resolved pairs would also be applied, along with any data from wrong-match reports.

Other applications are to any situation where links go to sites other than the source. This would include results of conventional search engines, as well as resource directories, sites referring users to suppliers, advertisers, etc.

It should be noted that the term server used throughout is not limited to a single centralized hardware unit. The server functionality described herein may be implemented by plural units utilizing distributed processing techniques well known in the art, and may be connected by any conventional methods, such as on a local area network (LAN) or a wide area network (WAN).

While the present invention has been discussed primarily in terms of its applicability to searching the Web, the concept has much broader applicability. For example, in the area of robot control, the above techniques can be used to allow a robot to understand more readily the actual intent of a command.

For example, in the general case, analogous to discovery searching, the robot command may be performable in many ways, such as "direct the excess inventory out of the active holding bin," allowing the robot to find any of several allowed places to move the inventory to, and leaving some degree of ambiguity that complicates translation. In the n=1 case, or signifier mapping, more specific feedback heuristics can be utilized as described above for Web signifier searches, to assist the robot in determining the one acceptable action to be taken in response to the command such as "direct the excess inventory to the secondary holding bin."

Another example is a plant-floor robot that responds to natural-language typed or voice commands that could be told "shift the connection from the output rack from chute number 1 to chute number 2." This technique would be highly useful in highly replicated plants, such as local routing centers for a national package express network.

Yet another example would be a smart TV that is responsive to voice or typed commands that is told "turn on the Giants football game." Such a device could be linked to a central server to aid in learning to relate commands and details of current programming. The process is almost exactly as outlined for Internet searching above. Another example is a post office mail sorter that identifies zip codes as commands for routing, based, for example, on OCR techniques or voice activation. In this case the queries would be the patterns in the optical scanner or the voice digitizer, and the correctness of hits would be tracked in any of various ways. The same process of the present invention would enable learning that would enhance the level of recognition and correct mapping to intended zip codes.

The above embodiments of the present invention have been described for purposes of illustrating how the invention may be made and used. The examples are relatively simple illustrations of the general nature of the many possible algorithms for applying feedback data that are possible. However, it should be understood that the present invention is not limited to the illustrated embodiments and that other variations and modifications of the invention and its various aspects will become apparent, after having read this disclosure, to those skilled in the art, all such variations and modifications being contemplated as falling within the scope of the invention, which is defined by the appended claims.

The invention claimed is:

1. A method of finding, in response to entry by a user of a user input recognized as a resource identity signifier, a single, intended target resource, the method comprising the steps of:

receiving a user input;

recognizing the user input as a resource identity signifier, wherein the resource identity signifier is independent of registered elements contained in a resource locator identifying at least one of a plurality of resources available on the network;

accessing, by a finder server responsive to the user input, database information that includes an index of available resources on a network, wherein the network comprises a plurality of interconnected computers, wherein some of the plurality of resources are identified by resource locators containing registered elements;

learning a social usage of the resource identity signifier from multi-user feedback gathered from a plurality of users with respect to previous results by the finder server; and determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource.

2. A method according to claim 1, wherein a resource is determined, at the determining step, as likely to be the intended target resource if the database information indicates that a confidence level associated with that resource is of at least a predetermined level.

3. A method according to claim 2, wherein, if none of the indexed resources has an associated confidence level of at least the predetermined level, the method further comprises the step of:

presenting the user with a list of one or more links to possible resources, the list being ordered according to confidence level, with a resource having a highest confidence level being ranked highest.

4. A method according to claim 2, wherein the method further comprises the steps of:
in a first user interface element:
causing a computer of the user to connect to a URL of an indexed resource having a highest confidence level; and
in a second user interface element:
presenting the user with a list of one or more links to possible resources, the list being ordered according to confidence level, with a resource having a highest confidence level being ranked highest.

5. A method according to claim 1, further comprising the step of causing a computer of the user to connect to the determined intended target resource, if any.

6. A method according to claim 1, further comprising the step of causing a computer of the user to display the determined intended target resource, if any.

7. A method of finding, in response to entry by a user of a user input recognized as a resource identity signifier, a single, intended target resource, the method comprising the steps of:
receiving a user input;
recognizing the user input as a resource identity signifier, wherein the resource identity signifier is independent of registered elements contained in a resource locator identifying at least one of a plurality of resources available on the network;
accessing, by a finder server responsive to the user input, database information that includes an index of available resources on a network, wherein the network comprises a plurality of interconnected computers, wherein some of the plurality of resources are identified by resource locators containing registered elements;
learning a social usage of the resource identity signifier from multi-user feedback gathered from a plurality of users with respect to previous results by the finder server;
determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource, wherein a resource is determined as likely to be the intended target resource if the database information indicates that a confidence level associated with that resource is of at least a predetermined level, and wherein, if none of the indexed resources has an associated confidence level of at least the predetermined level;
presenting the user with a list of one or more links to possible resources, the list being ordered according to confidence level, with a resource having a highest confidence level being ranked highest;
enabling the user to select a link from the list of one or more links;
adding information regarding the selection of the link to the feedback information stored in the database;
soliciting user feedback with regard to the selected link; and,
if the user indicates that the selected link is the intended target resource of the resource identity signifier, updating the database information so as to increase the confidence level associated with a mapping between the resource identity signifier and an address of the selected link, and, if the user indicates that the selected link is not the intended target resource of the resource identity signifier, updating the database information so as to decrease the confidence level associated with the mapping between the resource identity signifier and the address of the selected link.

8. A method of finding, in response to entry by a user of a user input recognized as a resource identity signifier, a single, intended target resource, the method comprising the steps of:
receiving a user input;
recognizing the user input as a resource identity signifier, wherein the resource identity signifier is independent of registered elements contained in a resource locator identifying at least one of a plurality of resources available on the network;
accessing, by a finder server responsive to the user input, database information that includes an index of available resources on a network, wherein the network comprises a plurality of interconnected computers, wherein some of the plurality of resources are identified by resource locators containing registered elements;
learning a social usage of the resource identity signifier from multi-user feedback gathered from a plurality of users with respect to previous results by the finder server;
determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource;
causing a computer of the user to connect to the determined intended target resource, if any;
soliciting user feedback with regard to the determined intended target resource to which the user's computer was connected in the directing step; and,
if the user indicates that the determined intended target resource to which the user's computer was connected is the intended target resource of the resource identity signifier, updating the database information so as to increase a confidence level associated with a mapping between the resource identity signifier and an address of the determined intended target resource to which the user's computer was connected, and, if the user indicates that the resource to which the user's computer was connected is not the intended target resource of the resource identity signifier, updating the database information so as to decrease the confidence level associated with the mapping between the resource identity signifier and the address of the determined intended target resource to which the user's computer was connected.

9. An apparatus comprising a finder server operable to locate, in response to entry by the user of a user input recognized as a resource identity signifier, a single, intended target resource intended by the user to uniquely correspond to the resource identity signifier, among the available resources, by:
receiving a user input;
recognizing the user input as a resource identity signifier, wherein the resource identity signifier is independent of registered elements contained in a resource locator identifying at least one of a plurality of resources available on the network;
accessing, by the finder server responsive to the user input, database information that includes the index of available resources, wherein some of the plurality of resources are identified by resource locators containing registered elements;

learning a social usage of the resource identity signifier from the multi-user feedback gathered from a plurality of users with respect to previous results by the finder server; and determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource.

10. An apparatus according to claim 9, wherein a resource is determined to be the intended target resource if the database information indicates that a confidence level associated with that resource is of at least a predetermined level.

11. An apparatus according to claim 10, wherein the apparatus is operable to, if none of the indexed resources has an associated confidence level of at least the predetermined level, present the user with a list of one or more links to possible resources, the list being ordered according to confidence level, with a resource having a highest confidence level being ranked highest.

12. An apparatus according to claim 10, wherein the apparatus is further operable to:
in a first user interface element:
cause a computer of the user to connect to a URL of an indexed resource having a highest confidence level; and
in a second user interface element:
present the user with a list of one or more links to possible resources, the list being ordered according to confidence level, with a resource having a highest confidence level being ranked highest.

13. An apparatus according to claim 9, wherein the finder server is further operable to cause a computer of the user to connect to the determined intended target resource, if any.

14. An apparatus according to claim 9, wherein the finder server is further operable to cause a computer of the user to display the determined intended target resource, if any.

15. An apparatus comprising a finder server operable to locate, in response to entry by the user of a user input recognized as a resource identity signifier, a single, intended target resource intended by the user to uniquely correspond to the resource identity signifier, among the available resources, by:
receiving a user input;
recognizing the user input as a resource identity signifier, wherein the resource identity signifier is independent of registered elements contained in a resource locator identifying at least one of a plurality of resources available on the network;
accessing, by the finder server responsive to the user input, database information that includes the index of available resources, wherein some of the plurality of resources are identified by resource locators containing registered elements;
learning a social usage of the resource identity signifier from the multi-user feedback gathered from a plurality of users with respect to previous results by the finder server; and
determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource, wherein a resource is determined to be the intended target resource if the database information indicates that a confidence level associated with that resource is of at least a predetermined level, and wherein the apparatus is operable to, if none of the indexed resources has an associated confidence level of at least the predetermined level, present the user with a list of one or more links to possible resources, the list being ordered according to confidence level, with a resource having a highest confidence level being ranked highest; and wherein the apparatus is operable to:
enable the user to select a link from the list of one or more links;
add information regarding the selection of the link to the feedback information stored in the database;
solicit user feedback with regard to the selected link; and,
if the user indicates that the selected link is the intended target resource of the resource identity signifier, updating the database information so as to increase the confidence level associated with a mapping between the resource identity signifier and an address of the selected link, and, if the user indicates that the selected link is not the intended target resource of the resource identity signifier, updating the database information so as to decrease the confidence level associated with the mapping between the resource identity signifier and the address of the selected link.

16. An apparatus comprising a finder server operable to locate, in response to entry by the user of a user input recognized as a resource identity signifier, a single, intended target resource intended by the user to uniquely correspond to the resource identity signifier, among the available resources, by:
receiving a user input;
recognizing the user input as a resource identity signifier, wherein the resource identity signifier is independent of registered elements contained in a resource locator identifying at least one of a plurality of resources available on the network;
accessing, by the finder server responsive to the user input, database information that includes the index of available resources, wherein some of the plurality of resources are identified by resource locators containing registered elements;
learning a social usage of the resource identity signifier from the multi-user feedback gathered from a plurality of users with respect to previous results by the finder server; and
determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource, wherein the finder server is further operable to cause a computer of the user to connect to the determined intended target resource, if any, wherein the apparatus is further operable to:
solicit user feedback with regard to the determined intended target resource to which the user's computer was connected; and, if the user indicates that the determined intended target resource to which the user's computer was connected is the intended target resource of the resource identity signifier, updating the database information so as to increase a confidence level associated with a mapping between the resource identity signifier and an address of the determined intended target resource to which the user's computer was connected, and, if the user indicates that the determined intended target resource to which the user's computer was connected is not the intended target resource of the resource identity signifier, updating the database information so as to decrease the confidence level associated with the mapping between the resource identity signifier and the address of the determined intended target resource to which the user's computer was connected.

17. A system for finding, in response to entry by a user of a user input recognized as a resource identity signifier, a single, intended target resource intended by the user to uniquely correspond to the resource identity signifier, among a plurality of resources available on a network comprising a plurality of interconnected computers, the system comprising:
   finder server means having access to: (a) database means for storing database information including an index of the available resources and multi-user feedback gathered from a plurality of users with respect to the results of previous executions of the system; and (b) learning system means for accessing and learning from the database information wherein the learning system means provides distinct weight to the multi-user feedback;
   receiving means for receiving a user input;
   recognizing means for recognizing the user input as a resource identity signifier, wherein the resource identity signifier is independent of registered elements contained in a resource locator identifying at least one of a plurality of resources available on the network;
   accessing means for accessing, by the finder server responsive to the user input, database information that includes the index of available resources, wherein some of the plurality of resources are identified by resource locators containing registered elements;
   learning means for learning a social usage of the resource identity signifier from the multi-user feedback gathered from a plurality of users with respect to previous results by the finder server; and
   determining means for determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource.

18. A system according to claim 17, wherein a resource is determined, by the access means, as likely to be the intended target resource if the database information indicates that a confidence level associated with that resource is of at least a predetermined level.

19. A system according to claim 18, further comprising:
   presenting means for, if none of the indexed resources has an associated confidence level of at least the predetermined level, presenting the user with a list of one or more links to possible resources, the list being ordered according to confidence level, with a resource having a highest confidence level being ranked highest.

20. A system according to claim 18, further comprising:
   means for, in a first user interface element, causing a computer of the user to connect to a URL of an indexed resource having a highest confidence level; and
   means for, in a second user interface element, presenting the user with a list of one or more links to possible resources, the list being ordered according to confidence level, with a resource having a highest confidence level being ranked highest.

21. A system according to claim 17, further comprising control means for causing a computer of the user to connect to the determined intended target resource, if any.

22. A system according to claim 17, further comprising control means for causing a computer of the user to display the determined intended target resource, if any.

23. A system for finding, in response to entry by a user of a user input recognized as a resource identity signifier, a single, intended target resource intended by the user to uniquely correspond to the resource identity signifier, among a plurality of resources available on a network comprising a plurality of interconnected computers, the system comprising:
   finder server means for having access to: (a) database means for storing database information including an index of the available resources and multi-user feedback gathered from a plurality of users with respect to the results of previous executions of the system; and (b) learning system means for accessing and learning from the database information;
   receiving means for receiving a user input;
   recognizing means for recognizing the user input as a resource identity signifier, wherein the resource identity signifier is independent of registered elements contained in a resource locator identifying at least one of a plurality of resources available on the network;
   accessing means for accessing, by the finder server responsive to the user input, database information that includes the index of available resources, wherein some of the plurality of resources are identified by resource locators containing registered elements;
   learning means for learning a social usage of the resource identity signifier from the multi-user feedback gathered from a plurality of users with respect to previous results by the finder server;
   determining means for determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource; wherein a resource is determined, by the determining means, as likely to be the intended target resource if the database information indicates that a confidence level associated with that resource is of at least a predetermined level;
   presenting means for, if none of the indexed resources has an associated confidence level of at least the predetermined level, presenting the user with a list of one or more links to possible resources, the list being ordered according to confidence level, with a resource having a highest confidence level being ranked highest;
   selection means for enabling the user to select a link from the list of one or more links;
   adding means for adding information regarding the selection of the link to the feedback information stored in the database;

soliciting means for soliciting user feedback with regard to the selected link; and means for, if the user indicates that the selected link is the intended target resource of the resource identity signifier, updating the database information so as to increase the confidence level associated with a mapping between the resource identity signifier and an address of the selected link, and, if the user indicates that the selected link is not the intended target resource of the resource identity signifier, updating the database information so as to decrease the confidence level associated with the mapping between the resource identity signifier and the address of the selected link.

24. A system for finding, in response to entry by a user of a user input recognized as a resource identity signifier, a single, intended target resource intended by the user to uniquely correspond to the resource identity signifier, among a plurality of resources available on a network comprising a plurality of interconnected computers, the system comprising:

finder server means for having access to: (a) database means for storing database information including an index of the available resources and multi-user feedback gathered from a plurality of users with respect to the results of previous executions of the system; and (b) learning system means for accessing and learning from the database information;

receiving means for receiving a user input;

recognizing means for recognizing the user input as a resource identity signifier, wherein the resource identity signifier is independent of registered elements contained in a resource locator identifying at least one of a plurality of resources available on the network;

accessing means for accessing, by the finder server responsive to the user input, database information that includes the index of available resources, wherein some of the plurality of resources are identified by resource locators containing registered elements;

learning means for learning a social usage of the resource identity signifier from the multi-user feedback gathered from a plurality of users with respect to previous results by the finder server;

determining means for determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource;

control means for causing a computer of the user to connect to the determined intended target resource, if any;

soliciting means for soliciting user feedback with regard to the determined intended target resource to which the user's computer was connected by the control means; and means for, if the user indicates that the determined intended target resource to which the user's computer was connected is the intended target resource of the resource identity signifier, updating the database information so as to increase a confidence level associated with a mapping between the resource identity signifier and an address of the determined intended target resource to which the user's computer was connected, and, if the user indicates that the determined intended target resource to which the user's computer was connected is not the intended target resource of the resource identity signifier, updating the database information so as to decrease the confidence level associated with the mapping between the resource identity signifier and the address of the determined intended target resource to which the user's computer was connected.

25. A computer-readable storage medium storing code for causing a processor-controlled finder server to perform a method of finding, in response to entry by the user of a user input recognized as a resource identity signifier, a single, intended target resource intended by the user to uniquely correspond to the resource identity signifier, among the available resources, the method comprising the steps of:

receiving means for receiving a user input;

recognizing means for recognizing the user input as a resource identity signifier, wherein the resource identity signifier is independent of registered elements contained in a resource locator identifying at least one of a plurality of resources available on the network;

accessing means for accessing, by the finder server responsive to the user input, database information that includes the index of available resources, wherein some of the plurality of resources are identified by resource locators containing registered elements;

learning means for learning a social usage of the resource identity signifier from the multi-user feedback gathered from a plurality of users with respect to previous results by the finder server; and determining means for determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource.

26. A computer-readable medium according to claim 25, wherein a resource is determined, in the accessing step, as likely to be the intended target resource if the database information indicates that a confidence level associated with that resource is of at least a predetermined level.

27. A computer-readable medium according to claim 26, wherein, if none of the indexed resources has an associated confidence level of at least the predetermined level, the method further comprises the step of:

presenting the user with a list of one or more links to possible resources, the list being ordered according to confidence level, with a resource having a highest confidence level being ranked highest.

28. A computer-readable medium according to claim 26, wherein the method further comprises the steps of:

in a first user interface element:
causing a computer of the user to connect to a URL of an indexed resource having a highest confidence level; and in a second user interface element:
presenting the user with a list of one or more links to possible resources, the list being ordered according to confidence level, with a resource having a highest confidence level being ranked highest.

29. A computer-readable medium according to claim 25, wherein the method further comprises the step of causing a computer of the user to connect to the determined intended target resource, if any.

30. A computer-readable medium according to claim 25, wherein the method further comprises the step of causing a computer of the user to display the determined intended target resource, if any.

31. A computer-readable storage medium storing code for causing a processor-controlled finder server to perform a method of finding, in response to entry by the user of a user input recognized as a resource identity signifier, a single, intended target resource intended by the user to uniquely correspond to the resource identity signifier, among the available resources, the method comprising the steps of:
receiving a user input;
recognizing the user input as a resource identity signifier, wherein the resource identity signifier is independent of registered elements contained in a resource locator identifying at least one of a plurality of resources available on the network;
accessing, by the finder server responsive to the user input, database information that includes the index of available resources on a network, wherein some of the plurality of resources are identified by resource locators containing registered elements;
learning a social usage of the resource identity signifier from multi-user feedback gathered from a plurality of users with respect to previous results by the finder server;
determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource, wherein a resource is determined, in the accessing step, as likely to be the intended target resource if the database information indicates that a confidence level associated with that resource is of at least a predetermined level, and wherein, if none of the indexed resources has an associated confidence level of at least the predetermined level, presenting the user with a list of one or more links to possible resources, the list being ordered according to confidence level, with a resource having a highest confidence level being ranked highest;
enabling the user to select a link from the list of one or more links;
adding information regarding the selection of the link to the feedback information stored in the database;
soliciting user feedback with regard to the selected link; and,
if the user indicates that the selected link is the intended target resource of the resource identity signifier, updating the database information so as to increase the confidence level associated with a mapping between the resource identity signifier and an address of the selected link, and, if the user indicates that the selected link is not the intended target resource of the resource identity signifier, updating the database information so as to decrease the confidence level associated with the mapping between the resource identity signifier and the address of the selected link.

32. A computer-readable storage medium storing code for causing a processor-controlled finder server to perform a method of finding, in response to entry by the user of a user input recognized as a resource identity signifier, a single, intended target resource intended by the user to uniquely correspond to the resource identity signifier, among the available resources, the method comprising the steps of:
receiving a user input;
recognizing the user input as a resource identity signifier, wherein the resource identity signifier is independent of registered elements contained in a resource locator identifying at least one of a plurality of resources available on the network;
accessing, by the finder server responsive to the user input, database information that includes the index of available resources on a network, wherein some of the plurality of resources are identified by resource locators containing registered elements;
learning a social usage of the resource identity signifier from multi-user feedback gathered from a plurality of users with respect to previous results by the finder server;
determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource;
causing a computer of the user to connect to the determined intended target resource, if any;
soliciting user feedback with regard to the determined intended target resource to which the user's computer was connected; and,
if the user indicates that the determined intended target resource to which the user's computer was connected is the intended target resource of the resource identity signifier, updating the database information so as to increase a confidence level associated with a mapping between the resource identity signifier and an address of the determined intended target resource to which the user's computer was connected, and, if the user indicates that the determined intended target resource to which the user's computer was connected is not the intended target resource of the resource identity signifier, updating the database information so as to decrease the confidence level associated with the mapping between the resource identity signifier and the address of the determined intended target resource to which the user's computer was connected.

33. A system for finding resources on a network of interconnected computers on which a plurality of resources reside, the system comprising:
a client terminal operated by a user, the client terminal allowing the user to connect to resources located on the network; and
a finder server having access to:
(a) a database storing database information including: (i) an index of a plurality of resources available on the network; and (ii) multi-user feedback gathered from a plurality of users with respect to the results of previous operations of the system; and
(b) a learning system operable to access and learn from the database information,
wherein the finder server is operable to locate, in response to entry by the user of a user input recognized as a resource identity signifier, a single, intended target resource intended by the user to uniquely correspond to the resource identity signifier, among the available resources by:
receiving a user input;
recognizing the user input as a resource identity signifier, wherein the resource identity signifier is independent of registered elements contained in a resource locator identifying at least one of a plurality of resources available on the network;

accessing, by the finder server responsive to the user input, database information that includes the index of available resources on a network, wherein some of the plurality of resources are identified by resource locators containing registered elements;

learning a social usage of the resource identity signifier from multi-user feedback gathered from a plurality of users with respect to previous results by the finder server;

determining which, if any, of the indexed resources is likely to be the intended target resource that uniquely corresponds to the recognized resource identity signifier based on the social usage of the recognized resource identity signifier without regard to identification in the recognized resource identity signifier of registered elements in any resource locator corresponding to the resource; and directing a computer of the user so as to cause that computer to connect the user to an address of a resource, if any, determined as likely to be the intended target resource.

34. A method of identifying, in response to entry by a user of a user input recognized as an object identity signifier, a single, intended object to be acted upon, wherein the single, intended object to be acted upon is intended by the user to uniquely correspond to the object identity signifier, among a plurality of possible objects wherein the method comprises the steps of:

receiving a user input;

recognizing the user input as an object identity signifier, wherein the object identity signifier is independent of registered elements contained in any registered naming system for object names;

accessing, by the finder server responsive to the user input, database information that includes an index of the possible objects;

learning a social usage of the resource identity signifier from multi-user feedback gathered from a plurality of users with respect to previous results by the finder server; and determining which, if any, of the indexed objects is likely to be the intended target object that uniquely corresponds to the recognized object identity signifier based on the social usage of the recognized object identity signifier without regard to identification in the recognized object identity signifier of registered elements in any registered naming system for object names corresponding to the object.

35. An apparatus for identifying, in response to entry by a user of a user input recognized as an object identity signifier, a single, intended object to be acted upon, wherein the single, intended object to be acted upon is intended by the user to uniquely correspond to the object identity signifier, among a plurality of possible objects, the apparatus comprising:

a computer having access to:
(a) a database storing database information including (i) an index of the possible objects; and (ii) multi-user feedback gathered from a plurality of users with respect to the results of previous operations of the apparatus; and
(b) a learning system structured to access and learn from the database information,
wherein the apparatus is operable to:
receive a user input; recognize the user input as an object identity signifier, wherein the object identity signifier is independent of registered elements contained in any registered naming system for object names;

access, by the finder server responsive to the user input, database information that includes an index of the possible objects;

learn a social usage of the object identity signifier from multi-user feedback gathered from a plurality of users with respect to previous results by the apparatus; and determine which, if any, of the indexed objects is likely to be the intended target object that uniquely corresponds to the recognized object identity signifier based on the social usage of the recognized object identity signifier without regard to identification in the recognized object identity signifier of registered elements in any registered naming system for object names corresponding to the object.

36. A method of finding a single, intended target resource among a plurality of resources available on a network, the method comprising the steps of:

obtaining a user input;

accessing an index of available resources on a network, wherein some of the plurality of resources are identified by resource locators containing registered elements;

recognizing the user input as a resource identity signifier, wherein the resource identity signifier is independent of registered elements contained in a resource locator identifying at least one of a plurality of resources available on the network; and utilizing feedback information stored in a database to determine a resource likely to be the single, intended target resource that uniquely corresponds to the recognized resource identity signifier based on a social usage of the recognized resource identity signifier without regard to identification in the recognized resource identity signifier of registered elements in any resource locator corresponding to the resource, wherein the social usage of the resource identity signifier is learned from multi-user feedback gathered from a plurality of users with respect to previous results of the method.

37. A method according to claim 36, wherein the feedback information is gathered from a plurality of previous users of the method.

38. A method according to claim 36, further comprising the step of obtaining feedback from the user regarding the resource determined in the utilizing step.

39. A method according to claim 38, wherein the feedback information stored in the database is updated with the feedback obtained from the user.

40. An apparatus for finding a single, intended target resource among a plurality of resources available on a network, the apparatus comprising:

input means for enabling a user to enter a user input;

recognizing means for recognizing the user input as a resource identity signifier, wherein the resource identity signifier is independent of registered elements contained in a resource locator identifying at least one of a plurality of resources available on the network;

accessing means for accessing an index of available resources on a network, wherein some of the plurality of resources are identified by resource locators containing registered elements; and determination means for using feedback information stored in a database to determine a resource likely to be the single, intended target resource that uniquely corresponds to the recognized resource identity signifier based on a social usage of the recognized resource identity signifier without regard to identification in the recognized resource identity signifier of registered elements in any resource locator corresponding to the resource, wherein the social usage of the resource identity signifier is learned from multi-user feedback gathered from a plurality of users with respect to previous operations of the apparatus.

41. An apparatus according to claim 40, wherein the feedback information is gathered from a plurality of previous users of the method.

42. An apparatus according to claim 40, further comprising update means for updating the feedback information stored in the database with feedback obtained from the user regarding the resource determined by the determination means.

43. A computer-readable storage medium storing a program for implementing a method of finding a single, intended target resource among a plurality of resources available on a network, the method comprising the steps of:
 prompting a user to enter a user input;
 recognizing the user input as a resource identity signifier, wherein the resource identity signifier is independent of registered elements contained in a resource locator identifying at least one of a plurality of resources available on the network; and
 accessing an index of available resources on a network, wherein some of the plurality of resources are identified by resource locators containing registered elements;
 utilizing feedback information stored in a database to determine a resource likely to be the single, intended target resource that uniquely corresponds to the recognized resource identity signifier based on a social usage of the recognized resource identity signifier without regard to identification in the recognized resource identity signifier of registered elements in any resource locator corresponding to the resource, wherein the social usage of the resource identity signifier is learned from multi-user feedback gathered from a plurality of users with respect to previous results of the method.

44. A computer-readable medium according to claim 43, wherein the feedback information is gathered from a plurality of previous users of the method.

45. A computer-readable medium according to claim 43, wherein the method further comprises the step of obtaining feedback from the user regarding the resource determined in the utilizing step.

46. A computer-readable medium according to claim 45, wherein the feedback information stored in the database is updated with the feedback obtained from the user.

47. A method of finding a single, intended target resource among a plurality of resources available on the Internet, the method comprising the steps of:
 obtaining a user input;
 recognizing the user input as a resource identity signifier, wherein the resource identity signifier is independent of registered elements contained in a resource locator identifying at least one of a plurality of resources available on a network; and
 accessing an index of available resources on a network, wherein some of the plurality of resources are identified by resource locators containing registered elements;
 utilizing feedback information stored in a database to determine a resource likely to be the single, intended target resource that uniquely corresponds to the recognized resource identity signifier based on a social usage of the recognized resource identity signifier without regard to identification in the recognized resource identity signifier of registered elements in any resource locator corresponding to the resource, the feedback information relating to a result of the method, wherein the social usage of the resource identity signifier is learned from multi-user feedback gathered from a plurality of users with respect to previous results of the method.

48. A method according to claim 47, wherein the multi-user feedback information is obtained from the result of a system inquiry of a user.

49. A method according to claim 47, wherein the multi-user feedback information is obtained from clickstream data.

50. An apparatus for finding a single, intended target resource among a plurality of resources available on the Internet, the apparatus comprising:
 input means for enabling a user to enter a user input;
 recognizing means for recognizing the user input as a resource identity signifier, wherein the resource identity signifier is independent of registered elements contained in a resource locator identifying at least one of a plurality of resources available on a network; and
 means for accessing an index of available resources on a network, wherein some of the plurality of resources are identified by resource locators containing registered elements;
 determination means for using multi-user feedback information stored in a database, to determine a resource likely to be the single, intended target resource that uniquely corresponds to the recognized resource identity signifier based on a social usage of the recognized resource identity signifier without regard to identification in the recognized resource identity signifier of registered elements in any resource locator corresponding to the resource, the feedback information relating to a result of the operation of the apparatus, wherein the social usage of the resource identity signifier is learned from multi-user feedback gathered from a plurality of users with respect to previous operations of the apparatus.

51. An apparatus according to claim 50, wherein the multi-user feedback information is obtained from a result of a system inquiry of a user.

52. An apparatus according to claim 50, wherein the multi-user feedback information is obtained from clickstream data.

53. A computer-readable storage medium storing a program for implementing a method of finding a single, intended target resource among a plurality of resources available on the Internet, the method comprising the steps of:
 prompting a user to enter a user input;
 recognizing the user input as a resource identity signifier, wherein the resource identity signifier is independent of registered elements contained in a resource locator identifying at least one of a plurality of resources available on a network; and
 accessing an index of available resources on a network, wherein some of the plurality of resources are identified by resource locators containing registered elements;
 utilizing multi-user feedback information stored in a database, to determine a resource likely to be the single, intended target resource that uniquely corresponds to the recognized resource identity signifier based on a social usage of the recognized resource identity signifier without regard to identification in the recognized resource identity signifier of registered elements in any resource locator corresponding to the resource, the feedback information relating to a result of the method, wherein the social usage of the resource identity signifier is learned from multi-user feedback gathered from a plurality of users with respect to previous results of the method.

54. A medium according to claim 53, wherein the multi-user feedback information is obtained from a result of a system inquiry of a user.

55. A medium according to claim 53, wherein the multi-user feedback information is obtained from clickstream data.

* * * * *

UNITED STATES PATENT AND TRADEMARK OFFICE
CERTIFICATE OF CORRECTION

| | | |
|---|---|---|
| PATENT NO. | : 7,062,561 B1 | |
| APPLICATION NO. | : 09/576927 | |
| DATED | : June 13, 2006 | |
| INVENTOR(S) | : Richard Reisman | |

It is certified that error appears in the above-identified patent and that said Letters Patent is hereby corrected as shown below:

Column 32, line 3, in claim 35, "access, by the finder server responsive to the user input," should read --access, responsive to the user input--.

Signed and Sealed this

Twenty-sixth Day of June, 2007

JON W. DUDAS
*Director of the United States Patent and Trademark Office*